United States Patent
Liu et al.

(10) Patent No.: US 11,433,505 B2
(45) Date of Patent: Sep. 6, 2022

(54) SYSTEMS, METHODS AND TOOLS FOR DISTRIBUTING DIFFERENT PLURALITIES OF ABRASIVE PARTICLES TO MAKE ABRASIVE ARTICLES

(71) Applicant: 3M INNOVATIVE PROPERTIES COMPANY, St. Paul, MN (US)

(72) Inventors: Yuyang Liu, St. Paul, MN (US); Junting Li, Woodbury, MN (US); Geoffrey I. Wilson, Woodbury, MN (US); Ernest L. Thurber, Somerset, WI (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 52 days.

(21) Appl. No.: 16/469,783

(22) PCT Filed: Dec. 15, 2017

(86) PCT No.: PCT/US2017/066706
§ 371 (c)(1),
(2) Date: Jun. 14, 2019

(87) PCT Pub. No.: WO2018/118690
PCT Pub. Date: Jun. 28, 2018

(65) Prior Publication Data
US 2020/0086459 A1     Mar. 19, 2020

Related U.S. Application Data

(60) Provisional application No. 62/437,307, filed on Dec. 21, 2016.

(51) Int. Cl.
*B24D 11/00* (2006.01)
*B24D 11/02* (2006.01)
(Continued)

(52) U.S. Cl.
CPC ............ *B24D 11/001* (2013.01); *B24D 11/02* (2013.01); *B24D 3/14* (2013.01); *B24D 3/28* (2013.01);
(Continued)

(58) Field of Classification Search
CPC ........ B24D 11/001; B24D 11/02; B24D 3/14; B24D 3/28; B24D 18/0072
See application file for complete search history.

(56) References Cited

U.S. PATENT DOCUMENTS

| 5,201,916 A | 4/1993 | Berg et al. |
| 5,366,523 A | 11/1994 | Rowenhorst et al. |

(Continued)

FOREIGN PATENT DOCUMENTS

| WO | WO 2016/028683 | 2/2016 |
| WO | WO 2018/118688 | 6/2018 |
| WO | WO 2018/118699 | 6/2018 |

OTHER PUBLICATIONS

International Search Report for PCT International Application No. PCT/US2017/066706, dated Apr. 6, 2018, 5 pages.

*Primary Examiner* — Pegah Parvini
(74) *Attorney, Agent, or Firm* — Aleksander Medved

(57) ABSTRACT

A system includes a distribution tool, a backing, a first plurality of abrasive particles and a second plurality of abrasive articles. The distribution tool includes a first section and a second section. The first section is configured to receive the first plurality of abrasive particles and pass the first plurality of abrasive particles through one or more of the plurality of slots to the backing. The second plurality of abrasive particles differ in at least one of a size, an average weight and a shape from the first plurality of abrasive particles. The second section is configured to receive the second plurality of abrasive particles and pass the second plurality of abrasive particles through one or more of the plurality of slots to the backing.

11 Claims, 12 Drawing Sheets

(51) Int. Cl.
    *B24D 3/14*      (2006.01)
    *B24D 3/28*      (2006.01)
    *B24D 18/00*     (2006.01)

(52) U.S. Cl.
    CPC ...... *B24D 18/0072* (2013.01); *B24D 2203/00* (2013.01)

(56) References Cited

U.S. PATENT DOCUMENTS

| | | | |
|---|---|---|---|
| RE35,570 E | 7/1997 | Rowenhorst et al. | |
| 5,984,988 A | 11/1999 | Berg et al. | |
| 7,344,574 B2 | 3/2008 | Thurber et al. | |
| 8,034,137 B2 | 10/2011 | Erickson et al. | |
| 2005/0130568 A1* | 6/2005 | Welygan | B24D 11/001 451/59 |
| 2006/0048454 A1 | 3/2006 | Welygan et al. | |
| 2012/0231711 A1* | 9/2012 | Keipert | C09K 3/1409 51/295 |
| 2013/0312337 A1 | 11/2013 | Moren et al. | |
| 2013/0344786 A1 | 12/2013 | Keipert | |
| 2014/0000176 A1* | 1/2014 | Moren | B24D 3/34 51/295 |
| 2014/0017984 A1 | 1/2014 | Rehrig et al. | |
| 2014/0106126 A1 | 4/2014 | Gaeta et al. | |
| 2014/0250797 A1 | 9/2014 | Yener et al. | |
| 2014/0290147 A1* | 10/2014 | Seth | B24D 18/0054 51/298 |

\* cited by examiner

SYSTEMS, METHODS AND TOOLS FOR DISTRIBUTING DIFFERENT PLURALITIES OF ABRASIVE PARTICLES TO MAKE ABRASIVE ARTICLES

CROSS REFERENCE TO RELATED APPLICATIONS

This application is a national stage filing under 35 U.S.C. 371 of PCT/US2017/066706, filed Dec. 15, 2017, which claims the benefit of U.S. Provisional Application No. 62/437,307, filed Dec. 21, 2016, the disclosures of which incorporated by reference in their entireties herein.

BACKGROUND

The present disclosure relates generally to abrasive articles, and also, to tools, systems and methods for arranging abrasive particles on a backing as part of the manufacture of an abrasive article. In general, coated abrasive articles have an abrasive layer secured to a backing. The abrasive layer comprises abrasive particles and a binder that secures the abrasive particles to the backing. One common type of coated abrasive article has an abrasive layer comprised of a make coat or layer, a size coat or layer, and abrasive particles. In making such a coated abrasive article, a make layer precursor comprising a curable make resin is applied to a major surface of the backing. Abrasive particles are then at least partially embedded into the curable make resin, and the curable make resin is at least partially cured to adhere the abrasive particles to the major surface of the backing. A size layer precursor comprising a curable size resin is then applied over the at least partially cured curable make resin and abrasive particles, followed by curing of the curable size resin precursor, and optionally further curing of the curable make resin.

Application of the abrasive particles to a major face of a backing construction (e.g., a backing coated with a make layer precursor) is oftentimes accomplished via drop coating technique in which a bulk supply of the abrasive particles are fed through a hopper and fall onto the major face (e.g., onto or into the make layer precursor) under the force of gravity. A spatial orientation of the abrasive particles upon contacting the major face is entirely random in all directions. Alternatively, electrostatic coating (e-coat) is also well known, and generally employs an electrostatic field to propel the abrasive particles vertically against the force of gravity onto the major face (e.g., onto or into the make layer precursor). With electrostatic coating, it is possible to effect the orientation of the abrasive particles in one direction such that each abrasive particle's elongated dimension is substantially erect (standing up) with respect to the backing surface. However, electrostatic coating is more expensive than drop coating, and may not be viable with all types of abrasive particles (e.g., it can be difficult to consistently electrostatically coat relatively large abrasive particles).

In light of the above, a need exists for improved systems and methods for applying abrasive particles to a backing construction as part of the manufacture of an abrasive article.

SUMMARY

Aspects of the present disclosure are directed toward a method of making an abrasive article. The method can include: loading a first plurality of abrasive particles and a second plurality of abrasive particles to a distribution tool, the distribution tool has a first section for receiving the first plurality of abrasive particles and a second section for receiving the second plurality of abrasive particles, the first section and the second section each including a plurality of walls defining a plurality of slots, each of the plurality of slots being open to a lower side of the distribution tool, wherein the first plurality of abrasive particles differ in at least one of a size, an average weight and a shape from the second plurality of abrasive particles; distributing the first plurality of abrasive particles from the first section of the distribution tool on to a first major face of a backing located immediately below the lower side of the distribution tool and moving relative to the distribution tool; distributing the second plurality of abrasive particles from the second section of the distribution tool on to the first major face of the backing located immediately below the lower side of the distribution tool and moving relative to the distribution tool; wherein the first plurality of abrasive particles and the second plurality of abrasive particles when distributed on the backing extend in similar paths in a down-web direction of the backing, the similar paths are limited to a cross-web range defined by the plurality of walls.

The present disclosure includes a system for making an abrasive article. The system can include a distribution tool, a backing, a first plurality of abrasive particles and a second plurality of abrasive articles. The distribution tool includes a first section and a second section. Each of the first section and second section having a plurality of walls defining a plurality of slots. Each of the slots being open to a lower side of the distribution tool. The backing is configured to be disposed immediately adjacent the lower side of the distribution tool. The first section is configured to receive the first plurality of abrasive particles and pass the first plurality of abrasive particles through one or more of the plurality of slots to the backing. The second plurality of abrasive particles differ in at least one of a size, an average weight, chemistry and a shape from the first plurality of abrasive particles. The second section is configured to receive the second plurality of abrasive particles and pass the second plurality of abrasive particles through one or more of the plurality of slots to the backing.

The present disclosure provides an abrasive article having a y-axis, an x-axis transverse to the y-axis, and a z-axis orthogonal to the y-axis and x-axis. The abrasive article can comprise a first plurality of abrasive particles and a second plurality of abrasive particles. The first plurality of abrasive particles differ in at least one of a size, an average weight, chemistry and a shape from the second plurality of abrasive particles. The first plurality of abrasive particles can be spaced from the second plurality of abrasive particles by at least a minimum distance in the x-axis direction. Both the first plurality of abrasive particles and the second plurality of abrasive particles extend in similar paths to one another with respect to the y-axis.

According to another example embodiment, a coated abrasive article is provided. The coated abrasive article comprises: a backing, a make coat and a plurality of abrasive particles. The backing can have opposed first and second major surfaces, as well as, a longitudinal axis and a transverse axis. The make coat can be disposed on at least a portion of one of the first and second major surfaces. The plurality of abrasive particles can be secured to the backing via the make coat. The plurality of abrasive particles can comprise a first plurality of abrasive particles and a second plurality of abrasive particles. The first plurality of abrasive particles can differ in at least one of a size, an average weight, chemistry and a shape from the second plurality of abrasive particles. The first plurality of abrasive particles can be spaced from the second plurality of abrasive particles by at least a minimum distance in the transverse axis direction. Both the first plurality of abrasive particles and the second plurality of abrasive particles can extend in similar paths to one another with respect to the longitudinal axis direction.

In another embodiment, an abrasive disc is disclosed. The abrasive disc can have a backing having opposed first and second major surfaces, a radial axis, an annular path, and a z-axis orthogonal to at least one of the first and second major surfaces. The abrasive disc can have a make coat on at least one of the first and second major surfaces. Additionally the abrasive disc can have a plurality of abrasive particles secured to the backing via the make coat. The plurality of abrasive particles can comprise a first plurality of abrasive particles and a second plurality of abrasive particles. The first plurality of abrasive particles can differ in at least one of a size, an average weight, chemistry and a shape from the second plurality of abrasive particles. The first plurality of abrasive particles can be spaced from the second plurality of abrasive particles by at least a minimum distance in the radial axis direction. Both the first plurality of abrasive particles and the second plurality of abrasive particles can extend in similar paths to one another with respect to the annular path direction.

As used herein, the following terms may have the following meaning:

"Length" refers to the maximum caliper dimension of an object.

"Width" refers to the maximum caliper dimension of an object perpendicular to the length axis.

The term "thickness" refers to the caliper dimension of an object that is perpendicular to the length and width dimensions.

The term "caliper dimension" is defined as the distance between the two parallel planes restricting the object perpendicular to that direction.

The term "platey abrasive particle" and particles described as having a "plate-like shape" refer to an abrasive particle resembling a platelet and/or flake that is characterized by a thickness that is less than the length and width. For example, the thickness may be less than ½, ⅓, ¼, ⅕, ⅙, ⅐, ⅛, ⅑, or even less than 1/10 of the length and/or width.

The term "crushed abrasive particle" refers to an abrasive particle that is formed through a fracturing process such as a mechanical fracturing process. The material fractured to produce the crushed abrasive particle may be in the form of bulk abrasive or an abrasive precursor. It may also be in the form of an extruded rod or other profile or an extruded or otherwise formed sheet of abrasive or abrasive precursor. Mechanical fracturing includes, for example, roll or jaw crushing as well as fracture by explosive comminution.

The term "shaped abrasive particle" refers to a ceramic abrasive particle with at least a portion of the abrasive particle having a predetermined shape that is replicated from a mold cavity used to form a precursor shaped abrasive particle which is sintered to form the shaped abrasive particle. Except in the case of abrasive shards (e.g., as described in U.S. Pat. No. 8,034,137 B2 (Erickson et al.)), the shaped abrasive particle will generally have a predetermined geometric shape that substantially replicates the mold cavity that was used to form the shaped abrasive particle. The term "shaped abrasive particle" as used herein excludes abrasive particles obtained by a mechanical crushing operation.

DETAILED DESCRIPTION

Figure 1:
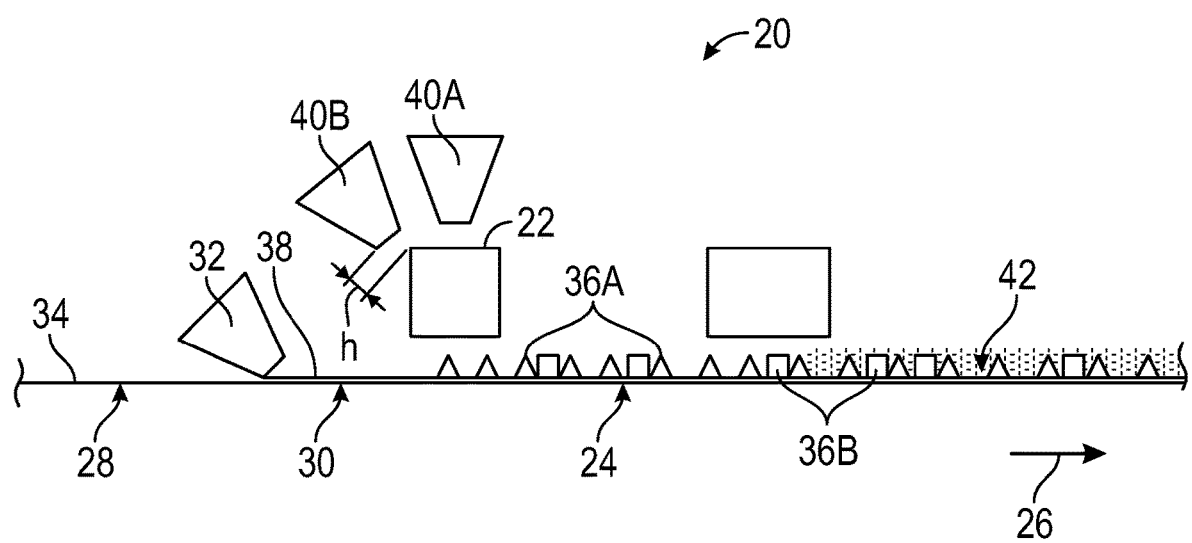
FIG. 1 is a simplified illustration of a portion of a system for manufacturing abrasive articles in accordance with principles of the present disclosure, the system including a distribution tool.

Aspects of the present disclosure relate to abrasive articles, tools, systems and methods for manufacturing abrasive articles with a backing construction. As a point of reference, FIG. 1 illustrates portions of a system 20 for manufacturing abrasive articles in accordance with principles of the present disclosure, including a distribution device 22 along with other components or devices commonly employed in the manufacture of abrasive articles. For example, the manufacture of abrasive articles conventionally includes structures and mechanisms (e.g., rollers, conveyor belts, etc.) for moving a backing construction web 24 along a path of travel or machine direction 26. The backing construction web 24 can assume various forms, and in some embodiments includes a backing 28 to which a make coat precursor resin 30 (or other resin or adhesive) has been applied. For example, with the non-limiting arrangement of FIG. 1, the backing 28 is advanced past a coater 32 that applies the make coat precursor resin 30 on a major surface 34 of the backing 28 thereby creating the backing construction web 24 (e.g., a coated backing). In other embodiments, multiple coatings can be applied to the backing 28 to generate the backing construction web 24 as delivered to the distribution tool 22; in yet other embodiments, the backing construction web 24 consists of the backing 28 alone (i.e., prior to interacting with the distribution device 22, the backing 28 is not subjected to a resin coating operation). Abrasive particles 36A and 36B (a size of which is greatly exaggerated in FIG. 1 for ease of understanding) are applied to a major face 38 of the backing construction web 24 by the distribution device 22 that otherwise distributes the abrasive particles 36A and 36B from supply 40A and supply 40B, respectively, as described below. After application of the abrasive particles 36, the backing construction web 24 exits the distribution device 22 and is optionally subjected to further processing (e.g., application of a size coat 42, application of additional abrasive particles by conventional means (e.g., e-coat), application of a grinding aid, application of a supersize coat, curing, cutting, etc.), such as from device 43, to produce a final abrasive article, such as a coated abrasive article.

As shown in FIG. 1, the abrasive particles 36A and 36B can be of a different type with respect to one another. Indeed, according to some embodiments, the abrasive particles 36A and 36B can have one or more of a different size, shape, chemistry, and/or average weight from one another.

Supplies 40A and/or 40B can be positioned a height H above the distribution device 22. The magnitude of height H can affect the efficiency with which particles are received in the distribution device 22. For example, sometimes particles can impact distribution device 22 after passing out of supply 40 and can bounce out of distribution device 22 if dropped from too great a height H. These particles are either lost from system 20, thereby producing waste, or land on major face 38 and can result in improperly aligned particles that can potentially decrease the abrasive efficiency of the coated abrasive article. Thus, it has been found that fewer particles 36A or 36B can be lost from distribution device 22 if supply 40 is brought closer to distribution device 22. In particular, bringing supply 40 closer to distribution device 22 can reduce the linear momentum of the particles, thereby reducing their speed upon contact with distribution device 22. This can lower the reactive impact force on the particle, which can reduce the particles from "jumping out" of distribution device 22. In other examples, the mass of the particles can be decreased to reduce the linear momentum of the particles or the height H can be adjusted as desired in view of the mass of the particles to reduce the linear momentum of the particles.

The distribution device 22 is configured to effectuate gross biased orientation and alignment of at least a majority of the abrasive particles 36A and 36B as applied and subsequently bonded to the major face 38. With this in mind, portions of embodiments of the distribution (also referred to herein as a distribution tool) are shown in shown in further detail in subsequent FIGURES.

Figure 3:
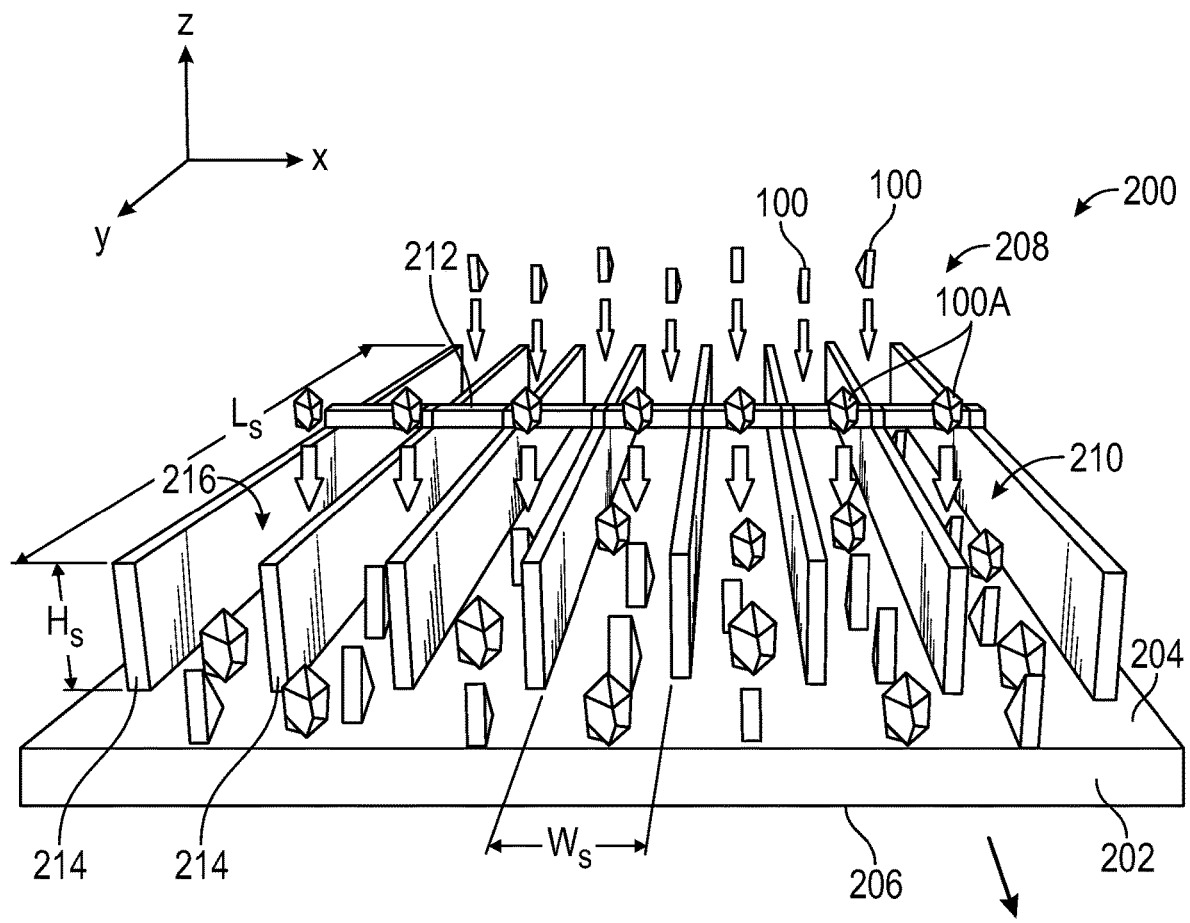
FIG. 3 is a perspective view of one embodiment of the distribution tool receiving differently shaped abrasive particles for disposition on a backing.
Figure 4:
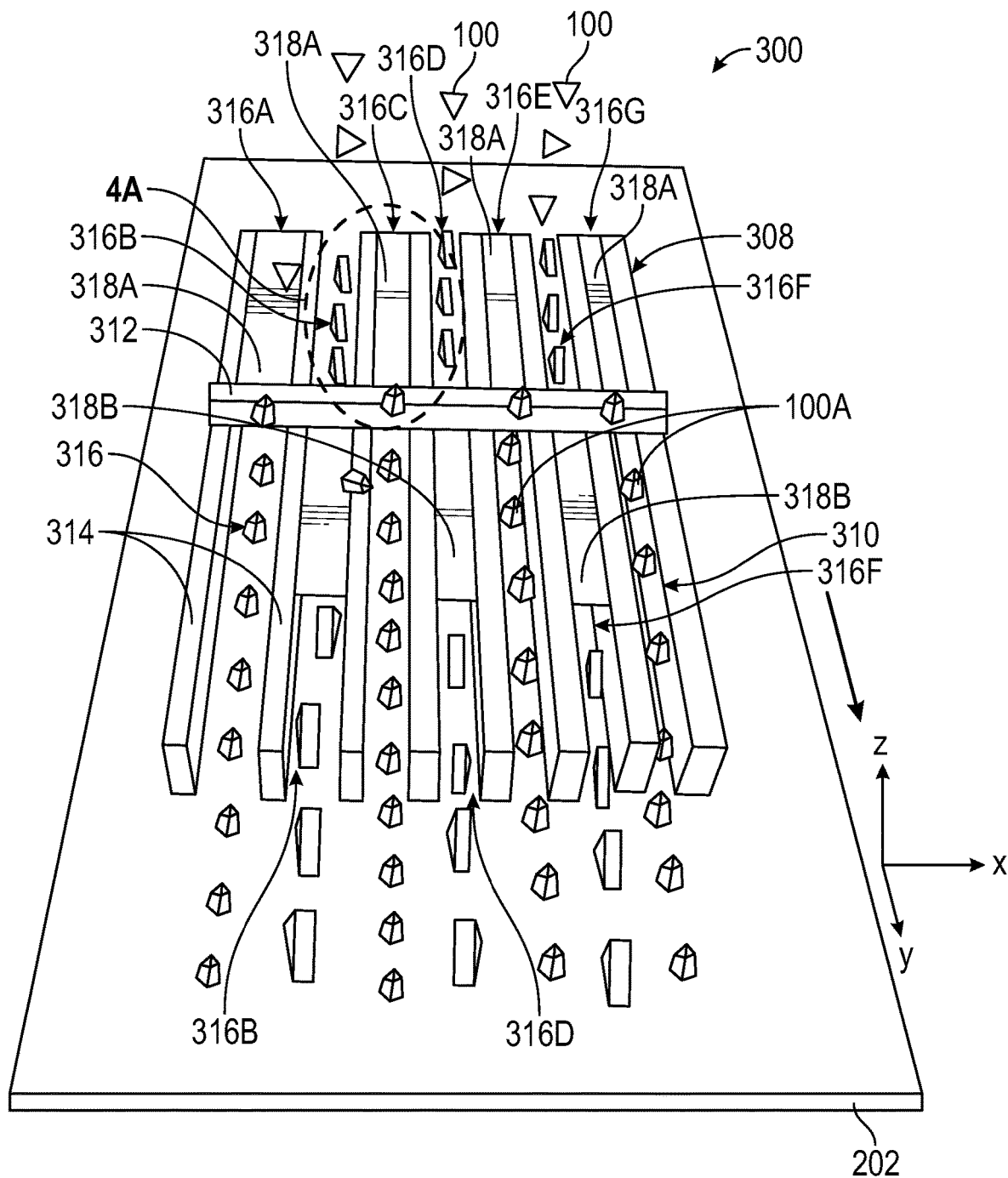
FIG. 4 is a perspective view of another embodiment of the distribution tool receiving different types of abrasive particles, the different types of abrasive articles selectively partitioned by the distribution tool to be arranged in distinct rows according to particle type on the backing.
Figure 4A:
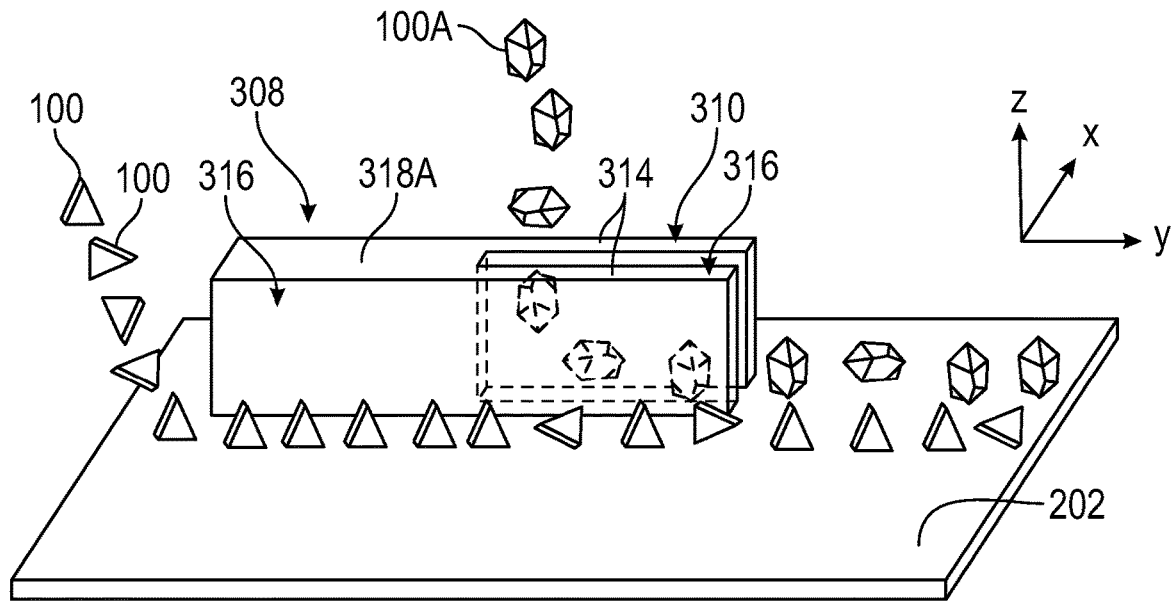
FIG. 4A is an enlargement of a portion of the distribution tool of FIG. 4.

The distribution devices 22 disclosed can utilize different types of abrasive particles, for example a first plurality of abrasive particles and a second plurality of abrasive particles. These particles can be feed to the distribution device from different supplies (e.g. supply 36A and supply 36B). These particles can be conveyed to different areas of the distribution device and can fall on different areas of the backing in either or both of an up-web/down-web location and a cross-web location. For example, in the embodiment of FIG. 3, a first plurality of abrasive particles of a first type are dropped to the distribution device up-web of a second plurality of abrasive particles of a second type. Such configuration allows for alternating or variation of particle type in a down-web direction (also referred to herein as a longitudinal axis direction, longitudinal direction or y-axis direction). In the embodiment of FIGS. 4-4A, a first plurality of abrasive particles of a first type are dropped to the distribution device up-web and cross-web of a second plurality of abrasive particles of a second type. This allows for alternating or variation of particle type in a cross-web direction (also referred to herein as a transverse axis direction, transverse direction or x-axis direction).

Figure 2A:
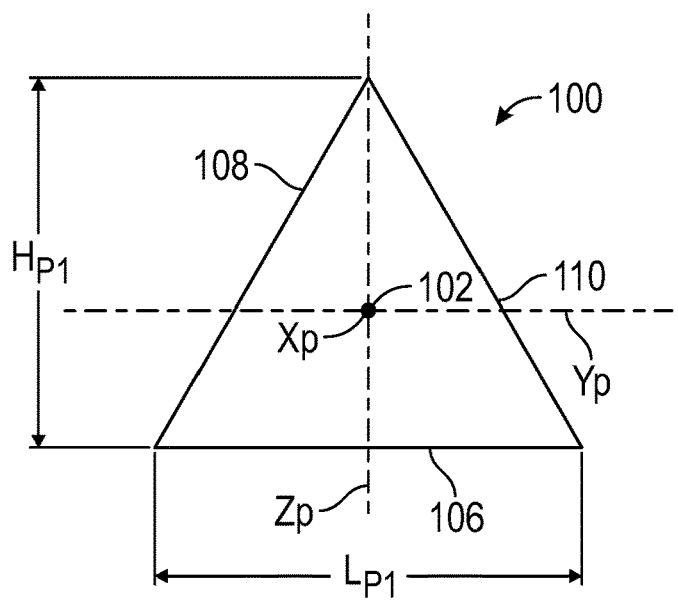
FIG. 2A is a top plan view of a triangular abrasive particle useful with the tools, systems, and methods of the present disclosure.

FIG. 2A is a plan view of a triangular abrasive particle 100 showing a major surface 102 thereof. FIG. 12B is an end view of the triangular abrasive particle 100 of FIG. 12A showing a thickness of the particle 100 in a minor surface 106. FIG. 12C is a side view of the triangular abrasive particle 100 of FIG. 12A showing a height of the particle as well as another minor surface 110.

The abrasive particles are described herein by way of example and can have various configurations. For example, the abrasive particles can be constructed of various materials including but not limited to ceramics, metal alloys, composites or the like. Similarly, the abrasive particles can be substantially entirely constructed of one material, can have coatings on portions thereof, or can have layers on one or more surfaces thereof according to some examples. The abrasive particles can be shaped abrasive particles (e.g., FIGS. 2A-2C) according to some examples. According to other examples the abrasive particles can comprise crushed particles, crush grains, agglomerates, or the like. Magnetizable abrasive particles can be used in loose form (e.g., free-flowing or in a slurry) or they can be incorporated into various abrasive articles as will be discussed subsequently.

The body of the abrasive particle can be shaped (e.g., precisely-shaped) or random (e.g., crushed). Shaped abrasive particles and precisely-shaped ceramic bodies can be prepared by a molding process using sol-gel technology as described in U.S. Pat. No. 5,201,916 (Berg); U.S. Pat. No. 5,366,523 (Rowenhorst (Re 35,570)); and U.S. Pat. No. 5,984,988 (Berg). U.S. Pat. No. 8,034,137 (Erickson et al.) describes alumina particles that have been formed in a specific shape, then crushed to form shards that retain a portion of their original shape features. In some embodiments, the ceramic bodies are precisely-shaped (i.e., the ceramic bodies have shapes that are at least partially determined by the shapes of cavities in a production tool used to make them).

Exemplary shapes of ceramic bodies include crushed, pyramids (e.g., 3-, 4-, 5-, or 6-sided pyramids), truncated pyramids (e.g., 3-, 4-, 5-, or 6-sided truncated pyramids), cones, truncated cones, rods (e.g., cylindrical, vermiform), and prisms (e.g., 3-, 4-, 5-, or 6-sided prisms).

The abrasive particles can have any size, but can be much smaller than the ceramic bodies as judged by average particle diameter, in yet other cases 4 to 2000 times smaller, in yet other cases 100 to 2000 times smaller, and in yet other cases 500 to 2000 times smaller, although other sizes can also be used. In this embodiment, the particles can have a Mohs hardness of 6 or less (e.g., 5 or less, or 4 or less), although this is not a requirement.

Figure 2B:
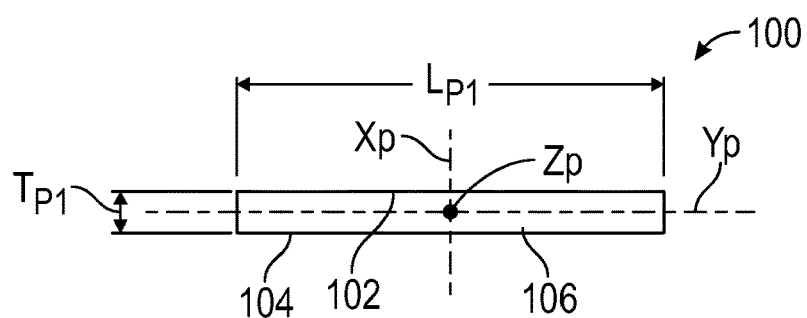
FIG. 2B is an end view of the triangular abrasive particle of FIG. 2A showing a thickness of the particle.
Figure 2C:
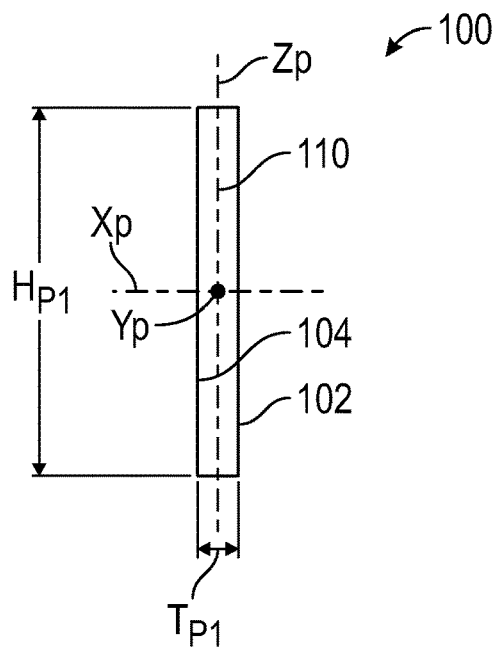
FIG. 2C is a side view of the triangular abrasive particle of FIG. 2A showing a height of the particle.

The gross biased orientation and alignment provided by distribution tools of the present disclosure can be characterized by reference to major axes and dimensions of the abrasive particles. FIGS. 2A-2C show a generic, non-limiting example of the abrasive particle 100, the exterior shape of which defines a particle maximum length, maximum height and maximum thickness $L_P$, $H_P$, $T_P$ dimensions that represent maximum dimensions of the abrasive particles 100 in three orthogonal planes. The particle maximum length, height and thickness $L_P$, $H_P$, $T_P$ are a function of a shape of the abrasive particle 100, and the shape may or may not be uniform. The present disclosure is in no way limited to any particular abrasive particle shape, dimensions, type, etc. However, with some shapes the "height" of the abrasive particle 100 may more conventionally be referred to as a "width".

The abrasive particle 100 is shown in FIGS. 2A-2C as arbitrarily having a triangle shape, with opposing major surfaces 202, 204 (one of which is visible in FIG. 2A) and opposing minor surfaces 206, 208 and 210 (sometimes referred to as side faces herein). Regardless of an exact shape, any abrasive particle can be described as providing the particle maximum length $L_P$ as the largest dimension in any one plane, the particle maximum height $H_P$ as being the largest dimension in any plane orthogonal to the plane of the maximum length $L_P$, and the maximum thickness $T_P$ as being the largest dimension in a third plane orthogonal to the planes of the maximum length $L_P$ and height $H_P$. The particle maximum length $L_P$ is greater than or equal to the particle maximum height $H_P$, and the particle maximum height $H_P$ is greater than or equal to the particle maximum thickness $T_P$. Abrasive particles useful with the present disclosure can have circular or spherical geometries such that the terms "length", "height" or "thickness" are inclusive of diameter.

A shape of the abrasive particle 100 is akin to an equilateral triangular prism. Due to the equilateral triangular prism shape, the maximum length $L_P$ and the maximum height $H_P$ are not uniform across a thickness of the abrasive particle 100 (i.e., the abrasive particle 100 can be viewed as defining opposing major surfaces 102, 104; the maximum length and height $L_P$, $H_P$ exist at both of the surfaces 102, 104). The maximum height $H_{P1}$ is known or can be calculated, and can equal the maximum length $L_P$. The maximum thickness $T_P$ is less than the maximum length and height $L_P$, $H_P$. Minor surfaces faces 106, 108, and 110 of the abrasive particle 100 have an identical shape and size, and are perpendicular to the major surfaces 102, 104.

A shape of the abrasive particle 100 defines a centroid at which particle $X_P$, $Y_P$ and $Z_P$ axes can be defined (the particle $X_P$, $Y_P$ and $Z_P$ axes are orthogonal relative to one another). With the conventions of FIG. 2A-2C, the particle $Z_P$ axis is parallel with the maximum height $H_P$, the $Y_P$ axis is parallel with the maximum length $L_P$, and the $X_P$ axis is parallel with the maximum thickness $T_P$. As a point of reference, the particle $X_P$, $Y_P$, $Z_P$ axes are identified for the abrasive particle 100 as a standalone object independent of the backing construction web 24 (FIG. 1); once applied to the backing construction web 24, a "z-axis rotation orientation" of the abrasive particle 100 is defined by the particle's angular rotation about a z-axis passing through the particle and through the backing to which the particle is attached at a 90 degree angle to the backing. Similarly, a "y-axis orientation" of the abrasive particle 100 is defined by the particle's disposition relative to a y-axis passing through the particle and along the backing to which the particle is attached. As discussed previously, a corresponding y-axis of the article can comprise the longitudinal axis and an up-web/down-web axis (or direction) if the backing is being manufactured on a web as described in several of the exemplary embodiments. An "x-axis orientation" of the abrasive particle 100 is defined by the particle's disposition relative to an x-axis passing through the particle and along the backing to which the particle is attached. As discussed previously, a corresponding x-axis of the article can comprise the transverse axis and cross-web axis (or direction) if the backing is being manufactured on a web as described in several of the exemplary embodiments.

Figure 6A:
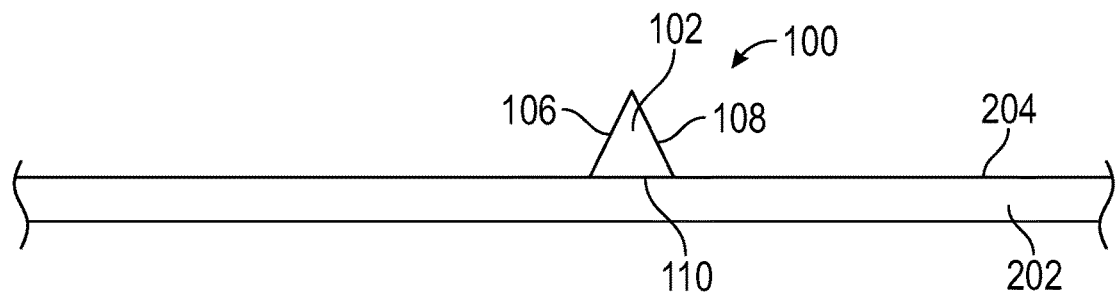
FIG. 6A is a side view of the abrasive particle of FIGS. 2A-2C.

The gross biased orientation effected by the distribution tools of the present disclosure entail dictating or limiting a spatial arrangement of the abrasive particle to a range of rotational orientations about the particle $Z_P$ axis and to a range of rotational orientations about the particle $Y_P$ axis; the gross biased orientation does not dictate or limit a rotational orientation about the particle $X_P$ axis. For example, FIG. 6D shows the abrasive particles of two different types being received within one of the respective slots of the distribution tool 300. The opposing walls 314 that define the slot limit a rotational orientation of the abrasive particles 101c, 101d and 101e (shaped abrasive particle) about the $Z_P$ axis to a limited range of orientations. Similarly, in FIG. 6D the abrasive particles gross biased orientation includes the opposing walls 314 limiting a rotational orientation of the abrasive particles 101c, 101d and 101e about the $Y_P$ axis within a limited range or orientations. Finally, FIG. 6B is a side view of the abrasive particle 100 within the slot 316 (referenced generally). As shown in FIG. 6B, the abrasive particles 100 can freely assume any rotational orientation about the $X_P$ axis (however once passed through the distribution tools the backing can limit the rotational orientation about the $X_P$ axis.

Furthermore, the distribution tools of the present disclosure can limit the spatial arrangement of the abrasive particles relative to one another on the backing in at least the cross-web direction. For example, FIG. 6D shows the abrasive particles 101c, 101d and 101e as well as particles of two different types being received within one of the respective slots of the distribution tool 300. The opposing walls 314 that define the slot 204 limit the cross-web disposition of the abrasive particles relative to one another. Thus, the abrasive particles are disposed at least a minimum distance (dmin)

from one another as dictated by the thickness of the walls so as to be segregated from one another in the cross-web direction. The arrangement of particles arranged by different particle type and spaced a distance apart so as to form distinctive rows is further illustrated in FIGS. 10A and 10B.

With the above general explanations in mind, it should be noted that dimensions of the walls and the slots for each distribution tool are selected as a function of expected geometry or dimensions of the abrasive particles to be processed. In more general terms, the dimensions of the walls and the slots are selected based upon the expected particle maximum length $L_P$, maximum height $H_P$, and maximum thickness $T_P$ of the abrasive particles to be processed (it being understood that a bulk supply of a particular abrasive particle will purport to contain identically sized and shaped abrasive particles; invariably, however, individual ones of the abrasive particles within the bulk supply will have dimensions that slightly vary from one another within an accepted tolerances; thus, when selecting dimensions for the respective walls and the slots for distributing the abrasive particles of the bulk supply as described in the present disclosure, the "dimensions" of any one abrasive particle of the bulk supply can be with reference to nominal dimension of the bulk supply).

Figure 5:
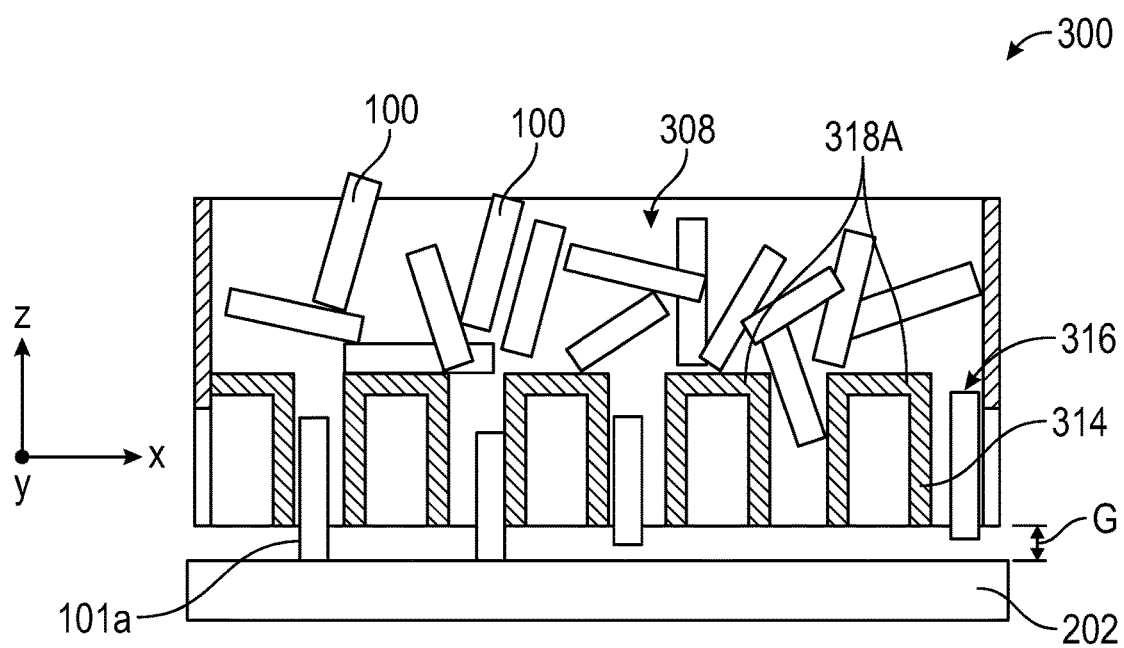
FIG. 5 is a cross-section taken in a cross-web direction of another embodiment of the distribution tool receiving abrasive particles, the distribution tool having walls and slots that orient the abrasive particles to fall with a minor surface disposed on the backing.

Dimensions of the walls and the slots are generally configured such that the slot width $W_S$ (FIG. 3) is less than at least the abrasive particle maximum length $L_P$, and optionally less than the abrasive particle maximum height $H_P$, dictating that the abrasive particle 100 must achieve a gross biased orientation before entering and passing through one of the slots, with the walls further serving to support the abrasive particle in the biased orientation as shown for example in FIGS. 5 and 6D. While the slot width $W_S$ (FIG. 3) can closely approximate the maximum thickness $T_P$ so as to dictate a more precise particle $Z_P$ axis and $Y_P$ axis rotation orientation of the applied abrasive particles 100 (i.e., as the slot width $W_S$ approaches the maximum thickness $T_P$, the range of possible $Z_P$ axis and $Y_P$ axis rotational orientations the abrasive particle 100 can assume and still "fit" in the slot is reduced), in some embodiments, the slot width $W_S$ is greater than the maximum thickness $T_P$ for enhanced throughput time (i.e., by providing a larger slot width $W_S$, abrasive particles 100 can randomly assume a larger range of $Z_P$ axis and $Y_P$ axis rotational orientations and still enter/pass through one of the slots, thereby making it "easier" for an individual abrasive particle 36 to obtain an appropriate spatial orientation and improving the mass flow rate of the abrasive particles 100 through the distribution tool), approaching, but not exceeding, the particle maximum length and maximum height $L_P$, $H_P$. For example, the slot width $W_S$ can be 50-75% of the maximum height $H_P$ (so long as the calculated value is greater than the maximum thickness $T_P$). In yet other embodiments, the selected slot width $W_S$ is a non-integer factor of the maximum thickness $T_P$ (i.e., the slot width $W_S$ is not equal to the maximum thickness $T_P$, $2T_P$, $3T_P$, etc.) to avoid clogging (e.g., were the slot width $W_S$ to be equal to two times the maximum thickness $T_P$, two abrasive particles 100 could become aligned side-by-side each other and then collectively become lodged to the opposing walls of one of the slots). With some embodiments incorporating the alternating height walls, a width between an adjacent pair of the taller walls can be selected to be greater than the particle maximum length $L_P$ and maximum height $H_P$. With this design criteria, a single abrasive particle 100 cannot span two "high" points (e.g., the second ends of an adjacent pair of the taller walls), greatly increasing the mass flow of the abrasive particles 100 through the distribution tool.

With the above description in mind various distribution tools are described. FIG. 3 shows a perspective view of a distribution tool 200 from a down-web position. The distribution tool 200 is positioned above a backing 202 which is moving down-web as indicated by an arrow. The backing 202 has a first major surface 204 and an opposing second major surface 206.

The distribution tool 200 is partitioned into a first section 208 and a second section 210. Although only two sections and two particle types are shown in FIG. 3, it should be recognized distribution tools can be constructed having three or more sections and three or more particle types according to some embodiments of this disclosure. The first section 208 can be disposed up-web of the second section 210. Such partition can be accomplished by a transverse wall 212 that extends generally cross-web (in the x-axis direction using the Cartesian coordinate system provided) across the distribution tool 200. The distribution tool 200 includes walls 214 oriented generally to extend up-web/down-web (in the y-axis direction using the Cartesian coordinate system provided). The walls 214 can couple to the transverse wall 212. Although the illustrated embodiment utilizes walls 214, other embodiments contemplate utilizing strings, wires or other types of members that can partition the particles as desired. The walls 214 are spaced apart from one another a width in the cross-web direction (x-axis direction). Each two of the walls 214 cooperatively define a slot 216 therebetween. As discussed above, the dimensions of the slot (slot width $W_S$, slot height $H_S$, and slot length $L_S$) are defined by the wall dimensions and can be selected as a function of expected abrasive particle dimensions (maximum length $L_P$, maximum height $H_P$ and maximum width $W_P$).

A plurality of abrasive particles 100 and 100A are provided to the distribution tool as part of the systems and methods described. The plurality of abrasive particles 100 and 100A can comprise a first plurality of abrasive particles 100 of a first type and a second plurality of abrasive particles 100A of a second type that differs from the first type. The second plurality of abrasive particles 100A are show generically as diamond shapes in FIG. 3 to illustrated the difference between the first plurality of abrasive particles 100 and the second plurality of abrasive particles 100A. The difference between the first plurality of abrasive particles 100 and the second plurality of abrasive particles 100A can comprise any geometric or weight difference, for example. Thus, the first plurality of abrasive particles 100 can differ from the second plurality of abrasive particles 100A in one or more of particle shape, particle size (e.g., one or more of maximum length $L_P$, maximum height $H_P$ and maximum width $W_P$ differs), average particle weight, chemistry, shaped v. unshaped (e.g., triangular v. crushed), or the like. In some cases, the second plurality of abrasive particles may not even comprise an abrasive particle but can be a filler or other material for example.

The first plurality of abrasive particles 100 are provided to the first section 208 from a source (recall source 40A of FIG. 1). Respective ones of the plurality of abrasive particles 100 fall through respective slots 216 to the backing 202 as indicated by arrows. In so doing, the gross biased rotational orientation and a segregated disposition of the first plurality of abrasive particles 100 is achieved as discussed above.

The first plurality of abrasive particles 100 then travel down-web with respect to the distribution tool 200 with movement of the backing 202. Conversely, in other embodiments (e.g., FIG. 7) the distribution tool can be moved relative to the backing to achieve a similar affect. It should be noted that movement of either the backing 202 or the distribution tool 200 need not be strictly limited to a straight linear path such as in the down-web direction (y-axis direction) but can also varied in several directions (e.g., also in the cross-web direction (x-axis direction) as desired. This would allow for rows of particles that have an intentional variation in both the down-web and the cross-web direction (e.g., a sinusoidal shape for example).

In passing through the distribution tool 200 and under the distribution tool 200 on the backing 202, the first plurality of abrasive particles 100 are segregated from one another by walls 214 in the cross-web direction. In traveling down-web the first plurality of abrasive particles 100 eventually leave the first section 208 and enter the second section 210 of the distribution tool 200.

The second plurality of abrasive particles 100A are provided to the second section 210 from a second source (recall source 40B of FIG. 1). Respective ones of the plurality of abrasive particles 100A fall through respective slots 216 to the backing 202 as indicated by arrows. In so doing, the gross biased rotational orientation and a segregated disposition of the second plurality of abrasive particles 100A can be achieved as discussed above in some embodiments. However, in embodiments where the first plurality of abrasive particles 100 and/or the second plurality of abrasive particles 100A are of sufficiently small geometric shape the gross biased rotational orientation is not achieved. Rather, the segregated disposition of the first plurality of abrasive particles 100 and/or the second plurality of abrasive particles 100A is solely achieved by the walls 212 as desired.

The second plurality of abrasive particles 100A join the first plurality of abrasive particles 100 on the backing 202 at least partially within the distribution tool 200. As shown in FIG. 3, the second plurality of abrasive particles 100A can be randomly disposed in the down-web direction (y-axis direction) relative to the first plurality of abrasive particles 100. For example, in some cases the second plurality of abrasive particles 100A can be interposed with the first plurality of abrasive particles 100 in the down-web direction. In other cases, several of the second plurality of abrasive particles 100A can be disposed adjacent one another without one of the first plurality of abrasive particles 100 interposed therebetween. It should be noted that in some embodiments, the second plurality of abrasive particles 100A can occupy a same up-web/down-web position (y-axis position) as the first plurality of abrasive particles 100 but can differ in disposition in the cross-web direction (x-axis direction).

In passing through the distribution tool 200 and under the distribution tool 200 on the backing 202, the second plurality of abrasive particles 100A are segregated from one another by walls 214 in the cross-web direction. In traveling down-web the second plurality of abrasive particles 100 and the first plurality of abrasive particles 100 can eventually leave the distribution tool 210 for further processing as show in FIG. 1.

FIG. 4 shows a distribution tool 300 that can be used according to the methods and systems described herein. The distribution tool 300 is viewed from a down-web position. The distribution tool 300 is positioned above the backing 202 which is moving down-web as indicated by an arrow. The backing 202 has the first major surface 204 and an opposing second major surface 206 as previously described.

A plurality of abrasive particles 100 and 100A are provided to the distribution tool 300 as part of the systems and methods described. The plurality of abrasive particles 100 and 100A can comprise the first plurality of abrasive particles 100 of a first type and the second plurality of abrasive particles 100A of a second type that differs from the first type in the manner previously described. In some cases, the second plurality of abrasive particles may not even comprise an abrasive particle but can be a filler or other material for example.

The distribution tool 300 has a construction very similar to that of the distribution tool 200 previously described. Thus, the distribution tool 300 can include a first section 308, a second section 310, a transverse wall 312, walls 314 and slots 316 as previously described. A major difference between the distribution device 300 and the distribution device 200 is that the distribution device 300 includes baffles 318A and 318B.

The baffles 318A are disposed in the first section 308 atop certain of the walls 314. The baffles 318A span slots 316 so as to block certain desired slots 316 (indicated as slots 316A, 316C, 316E and 316G) such that the first plurality of particles 100 cannot enter these slots 316A, 316C, 316E and 316G). Thus, the first plurality of particles 100 only pass through slots 316B, 316D, and 316F to the backing 202. Although shown as an alternating pattern (i.e. baffle 318A, open slot 316B, baffle 318A, open slot 316D, etc.) in the cross-web direction (x-axis direction) in FIG. 4, according to other embodiments any desired arrangement of baffles to open slots can be utilized.

The baffles 318B are alternated with baffles 318A in the cross-web direction (x-axis direction) and are offset therefrom in the down-web direction (y-axis direction). More particularly, the baffles 318B are disposed in the second section 310 atop certain of the walls 314. The baffles 318B span slots 316 so as to block certain desired slots 316 (indicated as slots 316B, 316D, and 316F) such that the second plurality of particles 100A cannot enter these slots 316B, 316D, and 316F). Thus, the second plurality of particles 100A only pass through slots 316A, 316C, 314E and 316G to the backing 202. Although shown as an alternating pattern (i.e. open slot 316A, baffle 318A, open slot 316C, baffle 318A, open slot 316F) in the cross-web direction (x-axis direction) in FIG. 4, according to other embodiments any desired arrangement of baffles to open slots can be utilized.

In passing through the distribution tool 300 and under the distribution tool 300 on the backing 202, the first plurality of abrasive particles 100 are segregated into certain cross-web locations on the backing 202 by the walls 314, slots 316 and baffles 318A as illustrated. In traveling down-web, the first plurality of abrasive particles 100 eventually leave the first section 308 and enter the second section 310 of the distribution tool 300 where the first plurality of abrasive particles 100 are segregated from the second plurality of abrasive particles 100A in the cross-web direction by walls 314 and baffles 318B. In this manner a desired spacing (cross-web distance) between the first plurality of abrasive particles 100 and the second plurality of abrasive particles 100A can be achieved. As shown in the embodiment of FIG. 4, a distinct row of the first plurality of abrasive particles 100 can extend in the down-web direction and can alternate and/or be disposed a distance from a row of the second plurality of abrasive particles 100A.

As shown in FIG. 4A, the first plurality of abrasive particles 100 are provided to the first section 308 such as a first source (recall source 40A of FIG. 1). The second plurality of abrasive particles 100A are provided to the second section 310 from a second source (recall source 40B of FIG. 1). Transverse wall 312 (FIG. 4) is removed in FIG. 4A. Respective ones of the first plurality of abrasive particles 100 and the second plurality of abrasive particles 100A fall through respective slots 316 to the backing 202 as dictated by the baffles (only baffle 318A is shown). In falling through the respective slots 316, the gross biased rotational orientation and a segregated disposition of the first plurality of abrasive particles 100 and the second plurality of abrasive particles 100A can be achieved as discussed above in some embodiments. However, in embodiments where the one of the first plurality of abrasive particles 100 and/or the second plurality of abrasive particles 100A are of sufficiently small geometric shape the gross biased rotational orientation is not achieved. Rather, the segregated disposition of the second plurality of abrasive particles 100A (within a cross-web range dictated by the walls 314) from the first plurality of abrasive particles 100 can be achieved. Similarly, segregated disposition of the first plurality of abrasive particles 100 (within a cross-web range dictated by the walls 314) from the second plurality of abrasive particles 100A can be achieved.

FIG. 5 is a cross-section of the distribution tool 300 of FIGS. 4 and 4A. FIGS. 5 and 6A-6D are provided to further illustrate a method of manufacturing including how the first plurality of abrasive particles 100 are disposed on the backing 202 by passing through the distribution tool 300 to achieve the gross biased rotational orientation.

According to FIG. 5, the distribution tool 300 is located immediately adjacent (e.g., slight above by a distance described in greater detail below) the backing 202. The elongated walls 314 (and thus the slots 316) are substantially aligned (e.g., within 10% of a truly aligned relationship) with the up-web/down-web direction.

During use, the first plurality abrasive particles 100 is loaded onto the distribution tool 300 at the first section 308. Individual ones of the first plurality of abrasive particles 100 will enter a respective one of the slots 316 as dictated by the baffles 318A and only upon achieving a gross spatial orientation dictated by dimensions of the slots 316. For example, a first abrasive particle 101a in FIG. 5 is spatially oriented so as to enter the slot 316, whereas a spatial orientation of a second abrasive particle 101b prevents entry into any of the slots 316.

As a point of reference, loading of the supply can include pouring or funneling (e.g., via vibratory feeder, belt driven drop coater, etc.) a large number of the abrasive particles 100 on to the distribution tool 300 under the force of gravity, with individual ones of the so-loaded abrasive particles 100 randomly assuming any spatial orientation. As the individual abrasive particles 100 repeatedly contact one or more of the walls 314, they deflect and assume a new spatial orientation, eventually becoming generally aligned with and assuming a spatial orientation appropriate for entering one of the slots 316 that is not blocked by one of the baffles 318A. Although baffles 318A are illustrated as flat in the z-axis direction in FIG. 5, according to other embodiments they may have a varying z-axis height to facilitate the abrasive particles 100 in entering the slots 316.

To assist in promoting the gross alignment and orientation, the distribution tool 300 (or any of the distribution device or tools discussed herein) can include a vibration device connected to the distribution tool 300, causing the abrasive particles 100 to vibrate around on surfaces of the distribution tool 100 until they obtain a suitable orientation and fall through one of the slots 316. Where provided, the direction of vibration can be in a plane of the walls 314; random vibration may reduce the mass flow rate of the abrasive particles 100 through the distribution tool 300 and may knock many of the applied abrasive particles 100 over as they exit the distribution tool 100.

In some embodiments in which the edges of the walls 314 can be are alternately offset (in the height direction) from one another, such that abrasive particles 100 are naturally encouraged to assume the spatial orientation appropriate for entering one of the slots 316 thereby reducing "bridging" of the abrasive particles 100 at the top of the distribution tool 300.

Once a necessary spatial orientation is achieved, the so-arranged abrasive particle 100 passes through the corresponding slot 316, falls on to the backing 202 and is at least partially bonded thereto (e.g., the first abrasive particle 101 identified in FIG. 5). The lower side of the distribution tool 300 is spaced from the backing 202 by a gap G that is less than a maximum dimension(s) of the abrasive particles 100. Thus, a portion of the abrasive particles 101a even when affixed to and disposed on the backing 202 remains within the corresponding slot 316.

Figure 6B:
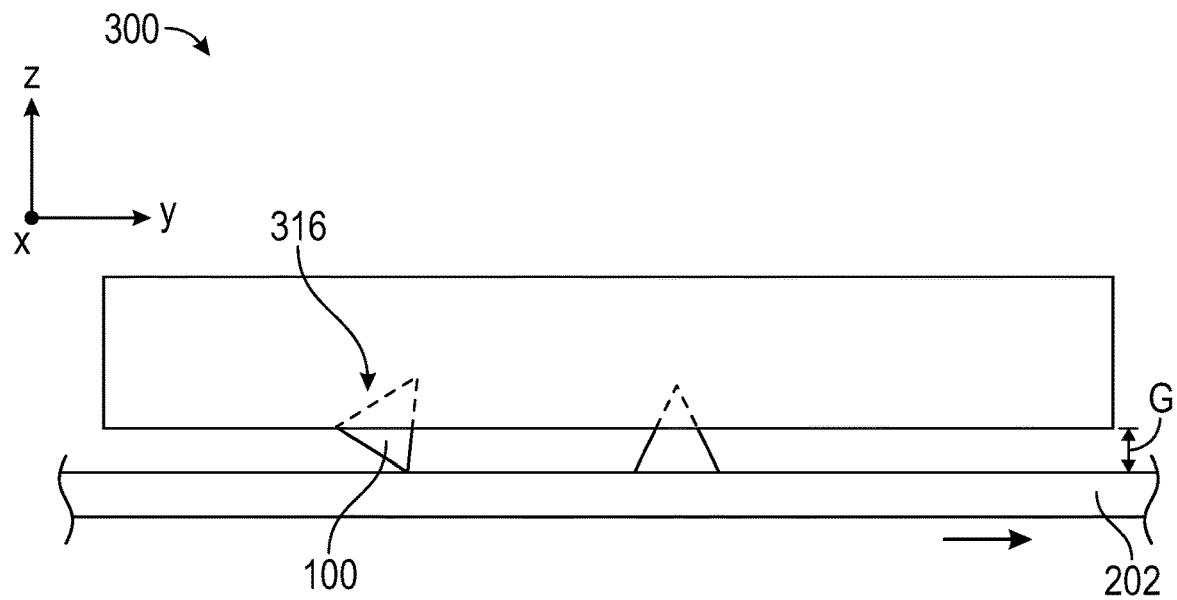
FIG. 6B is a side view of the distribution tool of FIG. 5 interacting with the abrasive particle of FIG. 6A as part of a system and method for manufacturing abrasive articles.
Figure 6C:
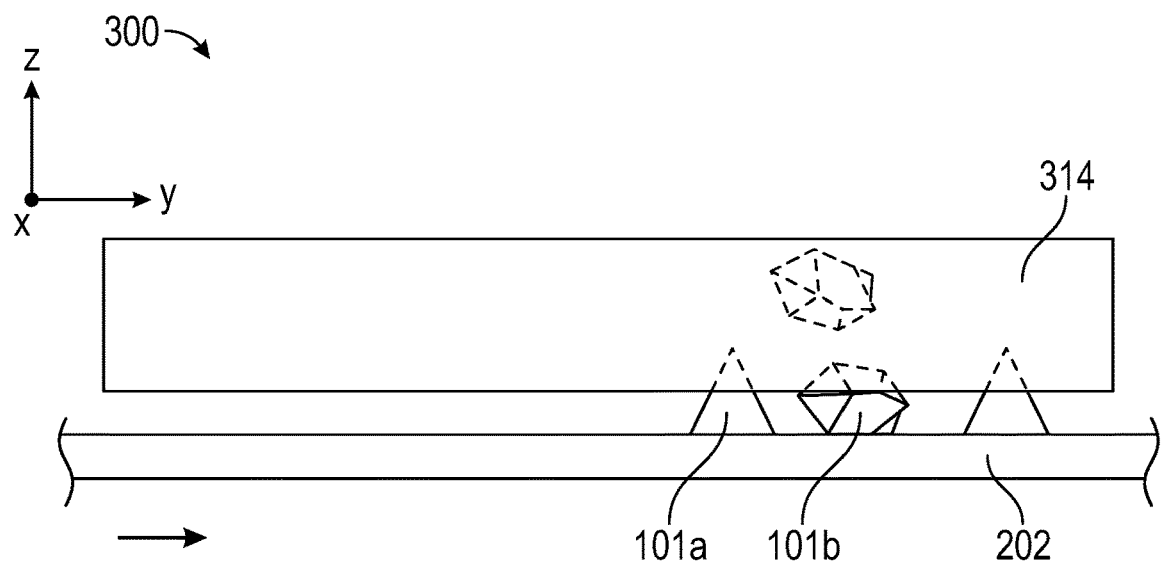
FIG. 6C is the arrangement of FIG. 6B at a later point in the manufacturing method.
Figure 6D:
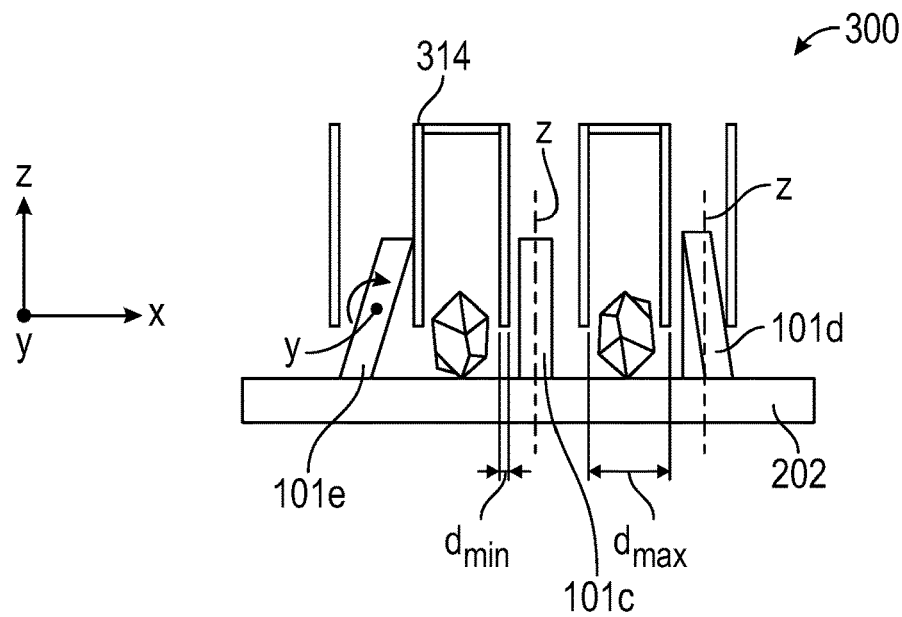
FIG. 6D is an end view of the arrangement of FIG. 6B.

As shown in FIGS. 6B-6C, the backing 202 is driven relative to the distribution tool 300 in the down-web direction (y-axis direction), such that the applied abrasive particles 101a and 101b travel relative to the distribution tool 300 with movement of the backing 202.

During this movement, one or more of the walls 314 of the distribution tool 300 can support the applied abrasive particles as shown in FIG. 5. This can prevent the applied abrasive particles 101a from experiencing an overt change in spatial orientation (e.g., the applied abrasive particles 101a are preventing from overtly tipping or rotating in a direction perpendicular to the corresponding slot 316).

FIG. 6B reflects that as the abrasive particles 100 initially drop or fall along one of the slots 316, rotational orientation about the particle $X_P$ axis (FIGS. 2A-2C) is effectively unconstrained, such that the abrasive particle 100 can initially contact the backing 202 at a wide range of particle $X_P$ axis rotational orientations. Once in contact with the backing 202, the abrasive particle 100 will naturally seek a stable orientation as it traverses the distribution tool 300 while being pulled along by the backing 202 in the down-web direction (y-axis direction).

Upon traveling beyond the first section of the distribution tool 300 as illustrated in FIG. 6C, the applied abrasive particles 101a and 101b (of two different types and in two different slots 316) are now more firmly bonded to the backing 202 and maintain the gross biased orientation and alignment dictated by the distribution tool 300. In some cases, the systems and methods of the present disclosure include the applied abrasive particles 101a and 101b being in simultaneously in contact with the backing 202 and in some cases one (or more) of the walls 314 of the distribution tool 300 over a dwell period beneath the distribution tool 300.

As shown in FIG. 6A, an abrasive article manufacturer may prefer that the abrasive particle 100 be applied to and retained at the first major surface 204 of the backing 202 in an "upright" position (i.e., one of the side faces 106-110 of the abrasive particle 100 bears against or is embedded into the first major surface 204, as compared to a non-upright orientation in which one of the particle major faces (e.g., 102) is at the first major surface 204).

The end view of FIG. 6D reflects that the gross biased orientation effectuated by the distribution tool 300 limits the z-axis rotational orientation (i.e., the applied particle's angular rotation about a z-axis passing through the particle and through the backing 202 to which the particle 100 is attached). Such z-axis rotational orientation is exhibited by two of the attached abrasive particles 101c and 101d to a prescribed range, although the z-axis rotational orientations will not be identical for all abrasive particles 100 and will depend on the particles individual geometry. Similarly, FIG. 6D shows the gross biased orientation effectuated by the distribution tool 300 limits the y-axis rotational orientation (i.e., the applied particle's 100 angular rotation about a y-axis passing through the particle 100 and relative to the backing 202 to which the particle 100 is attached). This is exhibited as a lean of abrasive particle 101e against the wall 314 with the arrows and indicated axis "y" in FIG. 6D. The distance dmin in FIG. 6D indicates a minimum cross-web distance between the first and second types of particles, which corresponds to a thickness of the wall 314. The distance dmax in FIG. 6D indicates a maximum cross-web distance between first and second types of particles which would be reduced by the diameter of any particle in the region. The distance dmax can comprise the cross-web distance of a slot according to one example.

Although the walls 314 are shown as oriented at substantially perpendicular to the backing 202 in FIG. 6D, in other embodiments the walls 314 can be disposed at an angle that is not perpendicular. For example, the walls 314 can be oriented so as to create an acute angle between a face of the wall 314 and the backing 202. This can allow the y-axis rotational orientation be imparted to the particle 100 so that one major surface of the particle 100 could rest at an acute angle with respect to the backing 202.

Figure 7:
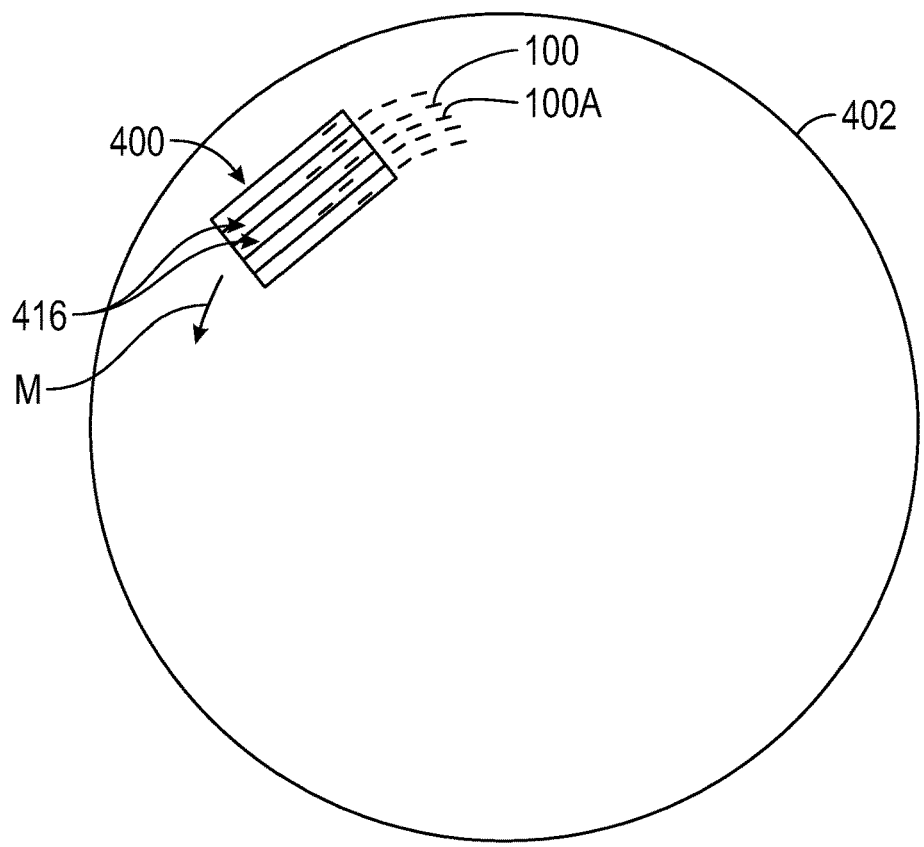
FIG. 7 is a simplified top view illustrating a method of manufacturing an abrasive article using a distribution tool in accordance with an example of the present disclosure.

The distribution tools of the present disclosure are equally useful with other abrasive article manufacturing systems and methods apart from those implicated by FIGS. 1, 3, 4 and 8. For example, the distribution tools of the present disclosure can be utilized to apply abrasive particles at a grossly biased orientation that is other than down-web. For example, the distribution tool 400 can be used to apply the first plurality of abrasive particles and the second plurality of abrasive particles as previously discussed and illustrated onto backing web constructions that have disc or other non-linear shapes. With these and other alternative embodiments, the backing and the distribution tool do not move relative to one another as the abrasive particles are being applied (e.g., the backing construction web and the distribution tool both remain stationary, or the backing construction web and the distribution tool move in tandem). In FIG. 7, the distribution tool 400 (of a similar construction as one of the distribution tool 200 or 300) is utilized to apply the abrasive particles 100 and 100A to a backing web construction or backing 402. The backing 402 has a disc shape. The abrasive particles 100 and 100A are initially supplied to the distribution tool 400, and then applied to a surface of the backing 402 in the manner previously described including by passing through slots 416. As the abrasive particles 100 and 100A are distributed on to the backing 402, the distribution tool 400 and the backing 402 can remain stationary relative to another; once, the abrasive particles 100 and 100A have been applied, the distribution tool 400 is incrementally moved (e.g., rotated) relative to the backing 402 in a direction represented by the arrow M (and/or vice-versa) until the distribution tool 400 is over a "new" area of the backing 402 for receiving additional ones of the abrasive particles 100 and 100A. Alternatively, the distribution tool 400 can be sized and shaped such that as the abrasive particles 100 and 100A are being supplied to the distribution tool 400, the distribution tool 400 can be slowly moved (e.g., rotated) relative to the backing 402 in the direction M (and/or vice-versa) at a sufficient rate that permits the applied abrasive particles 100 and 100A to pass beyond the channels 416 without experience an overt applied force (i.e., the applied abrasive particles 36 are not forced to fall over due to contact with one of the walls).

Figure 8:
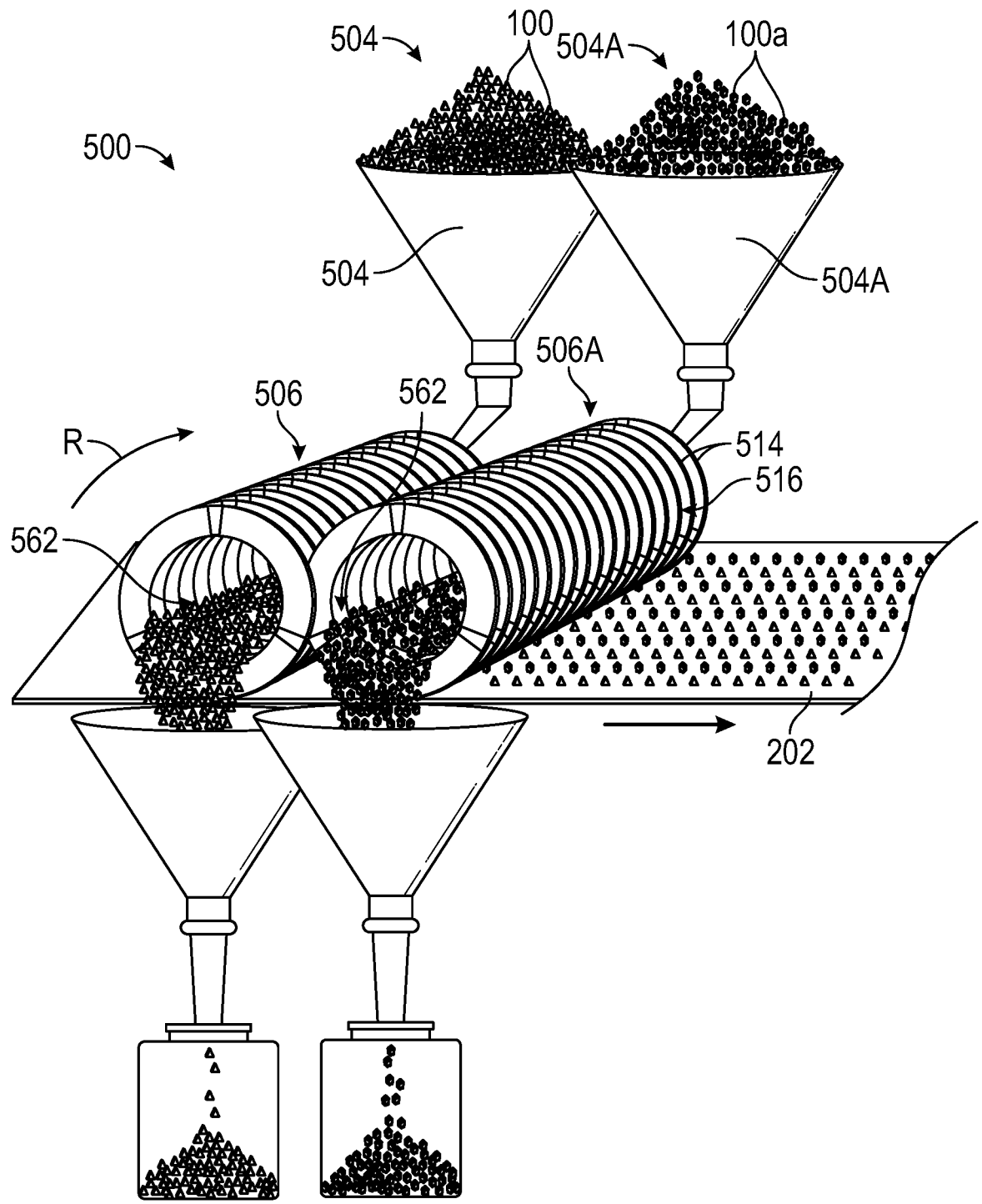
FIG. 8 is a perspective view of another embodiment of a distribution tool that is used as part of a method and system for manufacturing abrasive articles according to another example of the present disclosure.

FIG. 8 shows a distribution tool 500 according to another embodiment that can be used as part of the abrasive article manufacturing system or method. The distribution tool 500 is located immediately adjacent (e.g., slight above by a distance described previously with regards to prior embodiments) the backing 202. Further, the distribution tool 500 is configured and arranged relative to the backing 202 such that the slots 516 (referenced generally in FIG. 8) optionally are substantially aligned (e.g., within 10% of a truly aligned relationship) with the down-web direction (y-axis direction). However, other arrangements are also envisioned, such as the slots 516 being arranged substantially perpendicular to the down-web direction.

During use, a supply 502 and 502A (referenced generally) of the abrasive particles 100 and 100A is loaded to the distribution tool 500 via a source 504 and 504A, respectively. The distribution tool 500 can comprise two drums 506 and 506A each having a central bore 562, the aforementioned slots 516 and walls 514. According to one example, the source 504 and 504A can be akin to a mineral dropper having an outlet (referenced generally) that extends into each central bore 562, respectively. The supply of the abrasive particles 100 and 100A flows through the outlet and into the central bore 562 of each drum 506 and 506A, respectively.

Once within the central bore 562, individual ones of the abrasive particles 100 and 100A will enter a respective one of the slots 516 for the respective drum 506 and 506A. In some embodiments, entry of the abrasive particles 100 and/or 100A is possible only upon achieving a gross spatial orientation dictated by dimensions of the slots 516 as previously discussed.

As a point of reference, loading of the supply can include pouring or funneling (e.g., via vibratory feeder, belt driven drop coater, etc.) a large number of the abrasive particles 100 and 100A on to (or into) the distribution tool 500 under the force of gravity, with individual ones of the so-loaded abrasive particles 100 and 100A randomly assuming any spatial orientation.

Figure 8A:
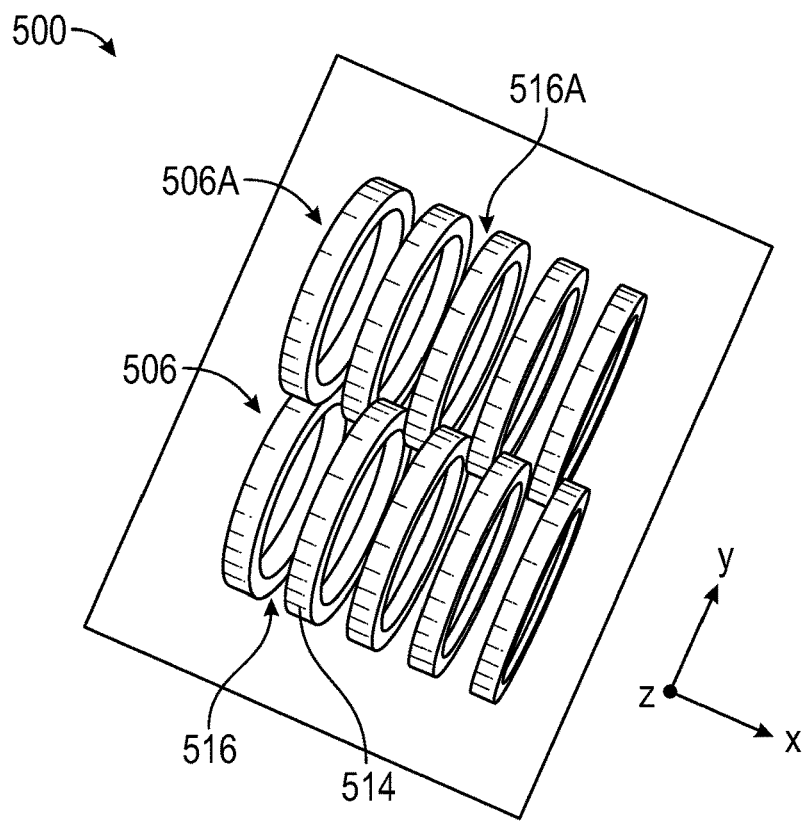
FIGS. 8A and 8B are simplified views from various perspectives of segments of the distribution tool of FIG. 8 with portions removed.

FIG. 8A provides a specific example of portions of the drums 506 and 506A illustrated. As shown in FIG. 8A, the slots 516 (indicated as 516 for the drum 506 and 516A for the second drum 506A) can be staggered with respect to one another in the cross-web direction (x-axis direction). In particular, the slots 516 of the drum 506 are staggered with respect to the slots 516A of the second drum 506A such that the wall 514 of the drum 506 will be disposed up-web of the slot 516A.

Figure 8B:
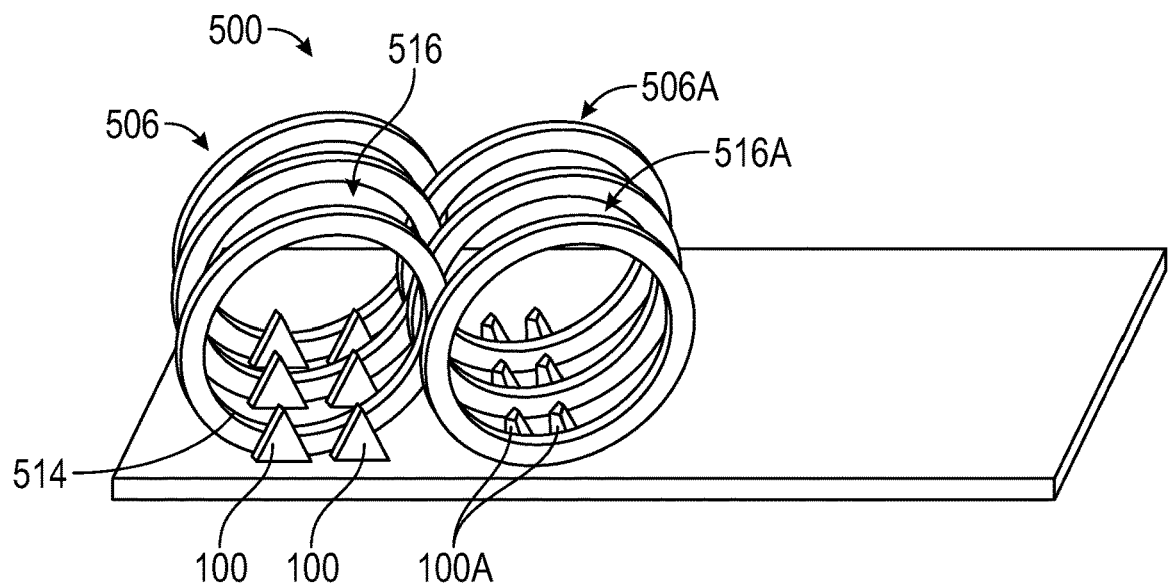

FIG. 8B shows passage of the respective first plurality of abrasive particles 100 through the drum 506 and the second plurality of abrasive particles 100A through the drum 506A. FIGS. 8A and 8B are a simplified representation of a portion of the distribution tool 500 with a portions of the drums 506 and 506A removed such that the first plurality of abrasive particles 100 (FIG. 8B) in the first slots 516 are visible (with a size highly exaggerated) and the second plurality of abrasive particles 100A (FIG. 8B) in the second slots 516A are visible (with a size highly exaggerated).

The first plurality of abrasive particles 100 and the second plurality of abrasive particles 100A in FIG. 8B is spatially oriented so as to enter the slots 516 and 516A, respectively.

With reference between FIGS. 8A and 8B, as the individual abrasive particles 100 and 100A repeatedly contact one or more of the walls 514 (ring shaped), they deflect and assume a new spatial orientation, eventually becoming generally aligned with and assuming a spatial orientation appropriate for entering one of the slots 516 and/or 516A. In this regard, as the supply of the abrasive particles 100 and 100A flows into each drum 506 and 506A, each drum 506 and 506A is rotated (e.g., via a rotation device (not shown)). This rotation (indicated by the arrow R in FIG. 8) mixes and vibrates, the abrasive particles 100 and 100A on surfaces of the drum 506 and 506A until they obtain a suitable orientation and fall through one of the slots 516 and 516A. Regardless, a large number of abrasive particles 100 and 100A can be disposed within individual one of the slots 516 and 516A at any one point in time rather than just the few particles illustrated in FIG. 8B.

Returning to FIG. 8A, the staggered slot 516 and 516A arrangement facilitates segregation of the first plurality of particles 100 a distance in the cross-web direction (x-axis direction) from the second plurality of particles 100A in a manner similar to that previously described in reference to FIGS. 4 and 4A.

Figure 9:
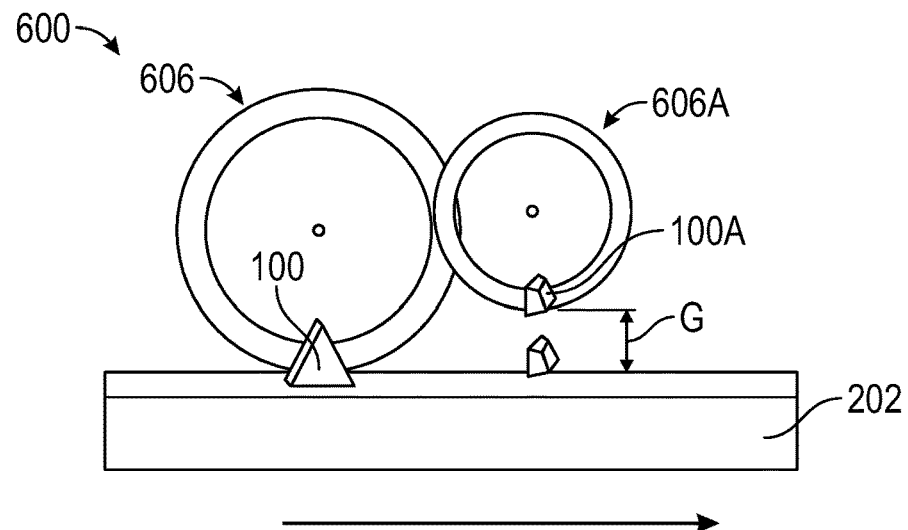
FIG. 9 is a simplified view of another embodiment of the distribution tool similar to the embodiment of FIGS. 8-8B save that one drum of the distribution tool is spaced form the backing.

FIG. 9 illustrates a distribution tool 600 of similar construction to that of the distribution tool 500 utilizing drums 606 and 606A, respectively. The embodiment of FIG. 9 differs in that the drum 606A can be disposed a substantially larger gap G from the backing 202 than the drum 606. Thus, the second plurality of particles 100A can be dropped from a greater distance than the first plurality of particles 100 as illustrated in FIG. 9.

According to another embodiment, the distribution tool can comprise a single drum rather than the previous two or more drums previously illustrated and described. The single drum could have dedicated slots configured for a first abrasive particle and dedicated second slots configured for a second abrasive particle, mineral or filler. For example, the single drum can have a double helix creating the two separate dedicated slots. The slots could then act as channels for each of the two abrasive particles. Thus, this embodiment could achieve an offset cross-web disposition for the different abrasive particle types using a single drum.

Figure 10A:
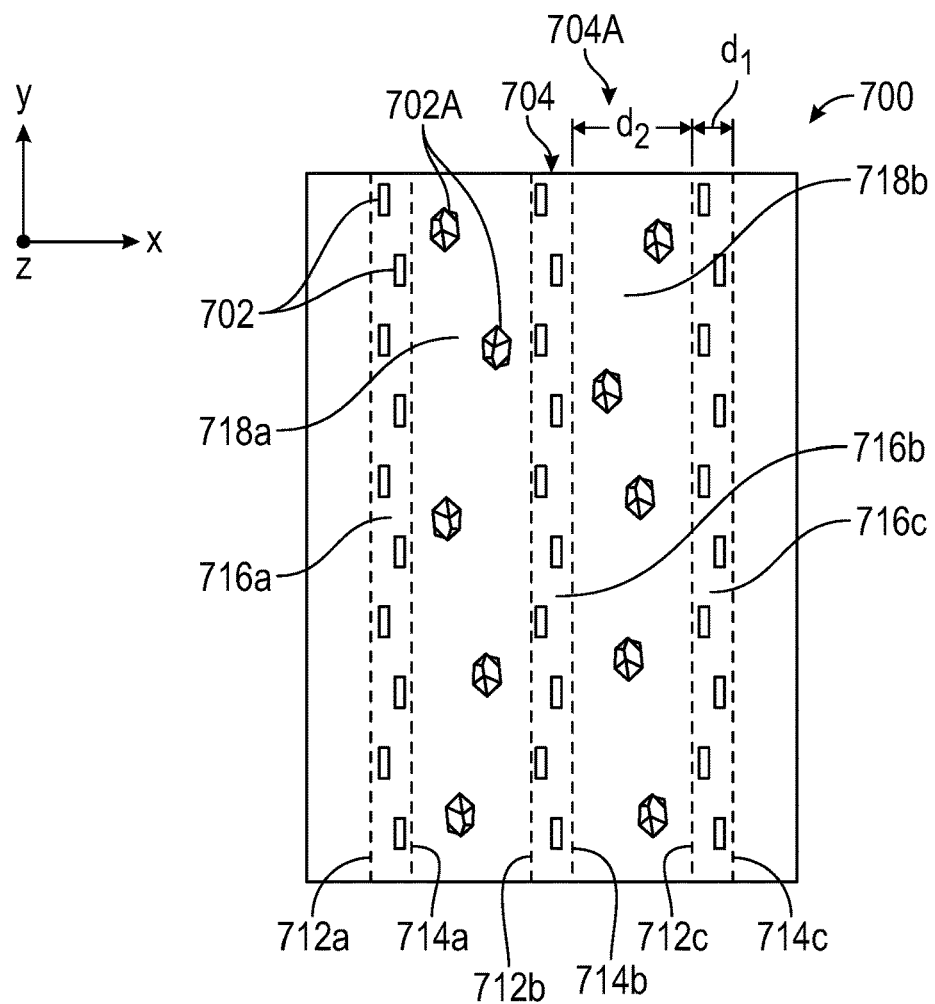
FIG. 10A is a top view of a first abrasive article having the first plurality of abrasive particles and the second plurality of abrasive particles, the first plurality of abrasive particles spaced from the second plurality of abrasive particles in an x-direction (e.g., corresponding to a cross-web direction).
Figure 10B:
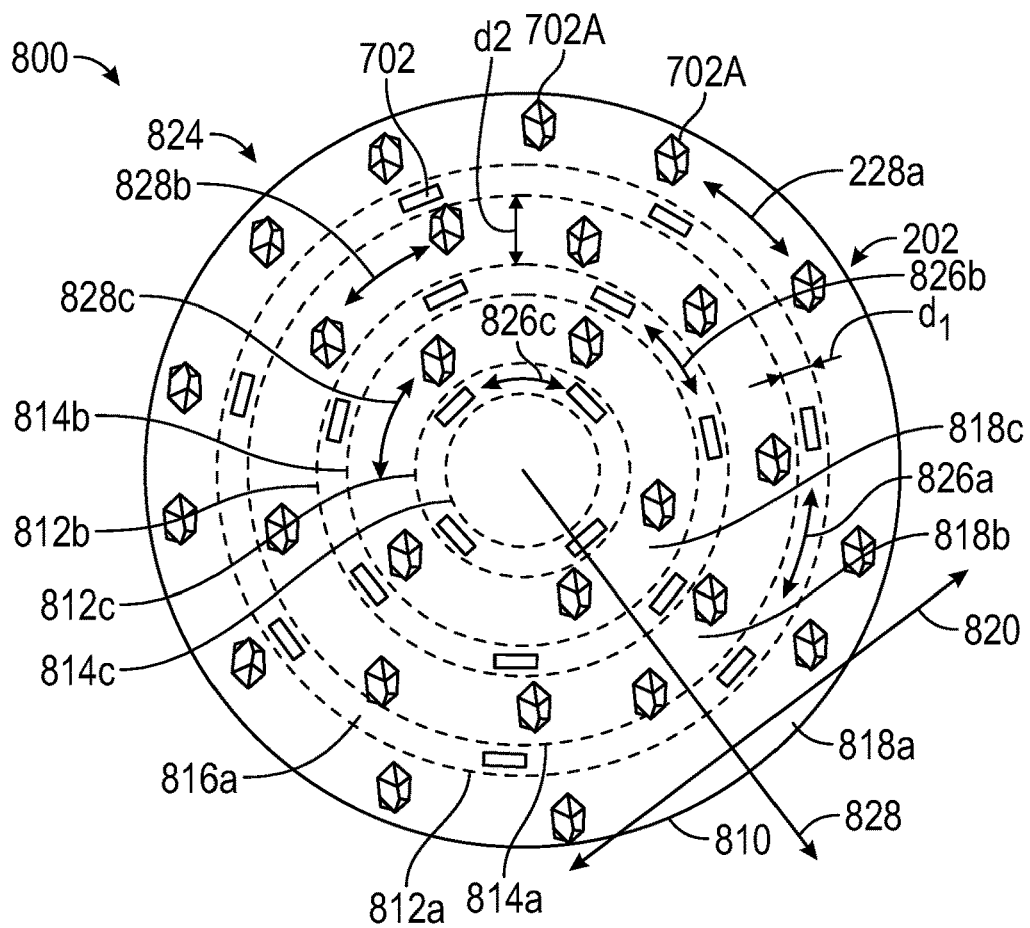
FIG. 10B is a top view of a second abrasive article shaped a disc having the first plurality of abrasive particles and the second plurality of abrasive particles according to another embodiment of the present disclosure.

FIGS. 10A and 10B show abrasive articles that utilize the first plurality of abrasive particles and the second plurality of abrasive particles previously discussed in reference to prior of the FIGURES.

Bearing in mind the particle referencing system previously described in reference to FIGS. 2A-2C, FIG. 10A shows a portion of an abrasive article 700 with a first plurality of abrasive particles 702 that are constrained by a pair of imaginary boundaries 712a, 714a, 712b, 714b, 712c, 714c. The distance between the imaginary boundaries 712a, 714a, 712b, 714b, 712c, 714c for the first plurality of abrasive particles 702 is designated distance $d_1$. These imaginary boundaries 712a, 714a, 712b, 714b, 712c, 714c correspond to regions 716a, 716b, 716c, respectively, where the first plurality of abrasive particles 702 can be generally be located. As shown in FIG. 10A, as a result of this constraint, rows 704 of cross-web (x axis) spaced apart first plurality of abrasive particles 702 are formed. In some cases, the regions 716a, 716b, 716c also represent locations where the first plurality of abrasive particles 702 are constrained with respect to the z-direction rotational orientation as previously discussed. Such constrain can be to a predetermined angle depending on the geometry of the first plurality of abrasive particles 702.

Similarly, FIG. 10A shows the abrasive article 700 with a second plurality of abrasive particles 702A that are constrained by the imaginary boundaries (simplified to be denoted as 714a and 712b, 714b and 712c). Both the first plurality of abrasive particles 702 and the second plurality of abrasive particles 702 extend in similar paths to one another with respect to the y-axis but are spaced at least a minimum distance in the x-axis direction from one another. The minimum distance can comprise a thickness of one of the walls previously described in reference to the prior distribution tools. The distance between the imaginary boundaries 714a and 712b and 714b and 712c for the first plurality of abrasive particles 702A is designated distance $d_2$. These imaginary boundaries 714a and 712b and 714b and 712c correspond to regions 718a and 718b, respectively, where the second plurality of abrasive particles 702A can be generally be located. As shown in FIG. 10A, as a result of this constraint, rows 704A of cross-web (x axis) spaced apart second plurality of abrasive particles 702A are formed. These can be alternated with the rows 704 of the first plurality of abrasive particles 702 in some embodiments. In some cases (though not the embodiment of FIG. 10A), the regions 718a and 718b also represent locations where the second plurality of abrasive particles 702A are constrained the z-direction rotational orientation. It should be noted that the size of the regions 718a and 718b can differ from that of the regions 716a, 716b, 716c as the distance $d_2$ can differ from distance $d_1$.

It will be recognized that the imaginary boundaries 712a, 714a, 712b, 714b, 712c, 714c need not be linear or parallel. That is, the imaginary boundaries 712a, 714a, 712b, 714b, 712c, 714c may be, for example, arcuate, curved, serpentine or irregular do to movement of the distribution tool 700 relative the backing or the backing relative to the distribution tool 700. Thus, the abrasive particles 702 and 702A may be provided in a variety of patterns including, for example, wavy, sinusoidal, circular or in a random path.

A distance between adjacent of the first plurality of abrasive particles 702 can vary randomly along the y-axis. Similarly, a distance $d_4$ between adjacent of the second plurality of abrasive particles 702A can vary randomly along the y-axis. Thus, the y-axis distance between adjacent of the first and second plurality of abrasive particles 702 and 702A is not fixed, and there is no discernable pattern to the arrangement of the first and second plurality of abrasive particles 702 and 702A in the y-axis direction. However, because the x-axis spacing distance between the first and second plurality of abrasive particles 702 and 702A is constrained to the aforementioned regions by baffles and walls, etc. the first and second plurality of abrasive particles 702 and 702A are spaced more uniformly in the x-axis direction than the y-axis direction.

Referring to FIG. 10B, there is shown an abrasive article 800 in the form of a circular disc 824. The abrasive disc 824 comprises a backing 202 as previously discussed having a first major surface, and a first plurality of abrasive particles 702 and a second plurality of abrasive articles 702A as previously discussed with reference to FIG. 10A. The first plurality of abrasive particles 702 and the second plurality of abrasive articles 702A are secured to the backing 202 via an optional make coat (not shown). Imaginary boundaries 812a, 814a, 812b, 814b, 812c, 814c define annular paths 826a, 826b, 826c and further define annular regions 816a, 816b, 816c that generally constrain the location of the second plurality of abrasive particles 702A. Similarly, the boundaries 810 and 812a, 814a and 812b, and 814b and 812c define further annular paths 828a, 828b, 828c and further define annular regions 818a, 818b, 818c that generally constrain the location of the second plurality of abrasive particles 702A.

In the illustrated embodiment, the abrasive disc 824 includes a first axis 820 tangent to the annular paths at the location of the first plurality of abrasive particles 702 and the second plurality of abrasive articles 702A. The abrasive disc 824 further includes a radial axis 828 orthogonal to the tangent axis 820, and a z-axis orthogonal to the tangent axis 820 and the radial axis 828 (the z-axis is not shown extending directly outwardly from the plane of the page). The radial spacing distance $d_2$ of the regions 818a, 818b and 818c can be controlled as can the radial spacing distance $d_1$ of the regions 816a, 816b and 816c. The radial spacing distance $d_2$ can differ from or be substantially the same as the radial spacing distance.

Figure 11:
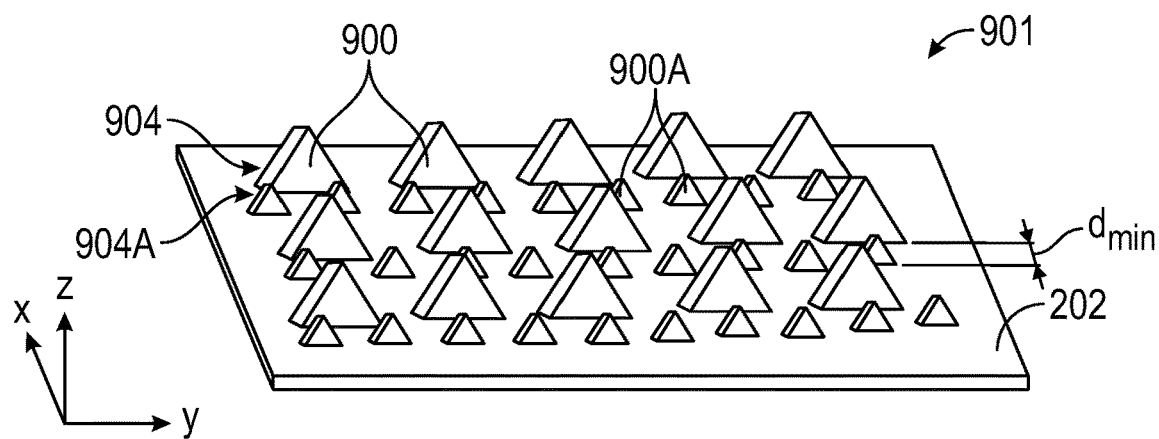
FIG. 11 shows the first plurality of abrasive particles and the second plurality of abrasive particles as shaped abrasive particles disposed on a backing according to yet another embodiment of the present disclosure.
Figure 11A:
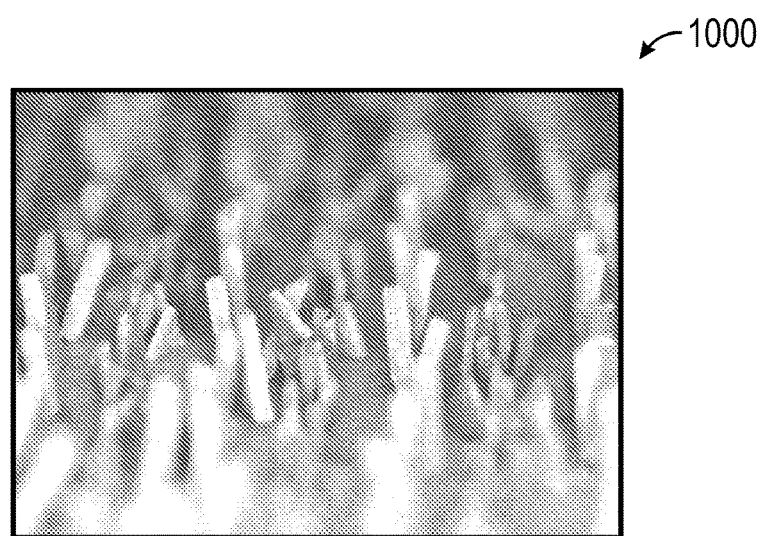
FIG. 11A is a digital image of shaped abrasive particles having a disposition on the backing similar to that of the embodiment of FIG. 11.
Figure 12:
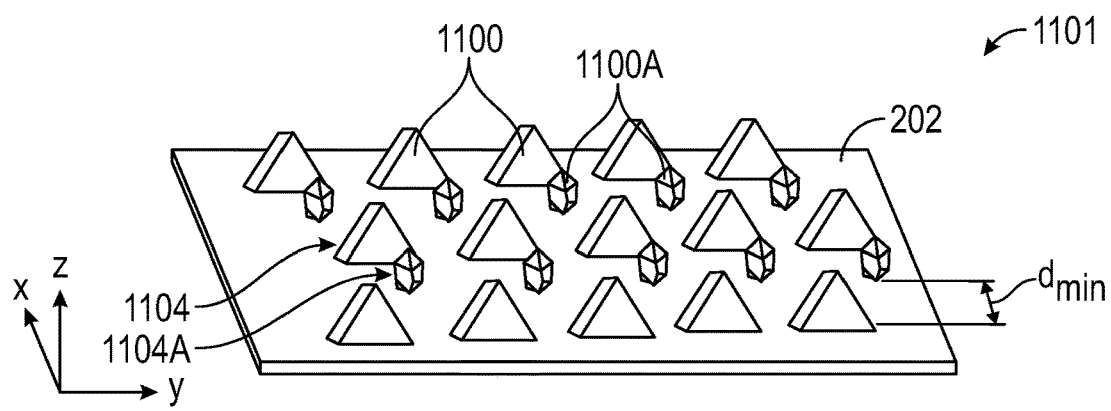
FIG. 12 shows the first plurality of abrasive particles as shaped abrasive particles and the second plurality of abrasive particles as crushed abrasive particles disposed on a backing according to yet another embodiment of the present disclosure.
Figure 12A:
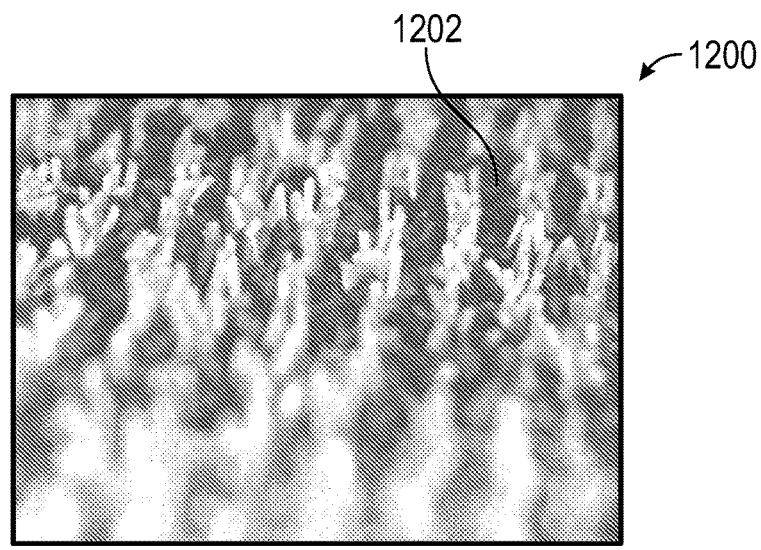
FIG. 12A is a digital image of shaped abrasive particles and crushed abrasive particles having a disposition on the backing similar to that of the embodiment of FIG. 12.

FIGS. 11-12A provide exemplary embodiments of abrasive articles having the first plurality of abrasive particles and the second plurality of abrasive particles. FIG. 11 shows a first plurality of abrasive particles 900 and the second plurality of abrasive particles 900A used in an abrasive article 901 that also includes a backing 202. The first plurality of abrasive particles 900 and the second plurality of abrasive particles 900A comprise shaped abrasive particles 902 with a construction similar to the embodiment previously described in reference to FIGS. 2A-2C. The first plurality of abrasive particles 900 differ from the second plurality of abrasive particles 900A in that the size and weight of the second plurality of abrasive particles 900A differs from the first plurality of abrasive particles 900. As shown in FIG. 11 the first plurality of abrasive particles 900 are spaced from the second plurality of abrasive particles 900A by at least a minimum distance drain in the x-axis direction (the cross-web direction). Both the first plurality of abrasive particles 900 and the second plurality of abrasive particles 900A extend in similar paths 904 and 904A to one another with respect to the y-axis. FIG. 11A is a digital image of an abrasive article 1000 having similar construction to article 900 of FIG. 11. The article 1000 has shaped abrasive particles of different size.

FIG. 12 shows a first plurality of abrasive particles 1100 and a second plurality of abrasive particles 1100A used in an abrasive article 1101 that also includes the backing 202. The first plurality of abrasive particles 1100 comprise shaped abrasive particles 1102 with a construction similar to the embodiment previously described in reference to FIGS. 2A-2C, while the second plurality of abrasive particles 1100A comprise a non-shaped abrasive. As shown in FIG. 11 the first plurality of abrasive particles 1100 are spaced from the second plurality of abrasive particles 1100A by at least a minimum distance $d_{min}$ in the x-axis direction (the cross-web direction). Both the first plurality of abrasive particles 1100 and the second plurality of abrasive particles 1100A extend in similar paths 1104 and 1104A to one another with respect to the y-axis.

FIG. 11A is a digital image of an abrasive article 1200 having abrasive particles but also including a non-abrasive material such as a filler 1202 that is disposed in the manner and utilizing the systems and methods described herein.

It has been found that the size (i.e. volume) and weight (i.e. mass) of the abrasive particles can impact the degree of z-direction rotational orientation, and the position or placement of the abrasive particles on the backing. The impact of the size and weight of the abrasive particle can be particularly pronounced depending on the particular technique used to apply the abrasive particles to the substrate. Accordingly, in certain embodiments, a portion of the abrasive particles may have an average volume of at least 2, 3, 5 or 7 cubic millimeters, and may have an average weight of at least about 0.5, 1, 2 or 3 milligrams.

It will be recognized that the abrasive articles according to the present disclosure may be converted into, for example, an endless or continuous belts, discs (including perforated discs), sheets and/or pads. For belt applications, two free ends of a sheet-like abrasive article may be joined together using known methods to form a spliced belt. In addition, it will be recognized that the make coat may be provided as a layer across the entire first major surface of the abrasive article, it may be provided on only select regions of the first major surface, or the make coat may be applied directly to the abrasive particles prior to affixing the abrasive particles to the backing. In addition, the coating weight of the abrasive particles in the various embodiments described herein may range from at least about 10, 50, 100, 500, 1000, 1500 or 2000 grams/square meter ($g/m^2$), to no greater than about 4000, 4500 or 5000 $g/m^2$.

The abrasive articles described herein can be used for a variety of abrading applications including, for example, grinding, cutting and machining applications. In a particular end use application, the abrasive article is a coated abrasive belt used to grind metal, such as titanium or steel.

In order that the invention described herein can be more fully understood, the following examples are set forth. It should be understood that these examples are for illustrative purposes only, and are not to be construed as limiting this invention in any manner.

EXAMPLES

Example 1 is a method for making an abrasive article that can comprise: loading a first plurality of abrasive particles and a second plurality of abrasive particles to a distribution tool, the distribution tool has a first section for receiving the first plurality of abrasive particles and a second section for receiving the second plurality of abrasive particles, the first section and the second section each including a plurality of walls defining a plurality of slots, each of the plurality of slots being open to a lower side of the distribution tool, wherein the first plurality of abrasive particles differ in at least one of a size, an average weight and a shape from the second plurality of abrasive particles; distributing the first plurality of abrasive particles from the first section of the distribution tool on to a first major face of a backing located immediately below the lower side of the distribution tool and moving relative to the distribution tool; and distributing the second plurality of abrasive particles from the second section of the distribution tool on to the first major face of the backing located immediately below the lower side of the distribution tool and moving relative to the distribution tool; wherein the first plurality of abrasive particles and the second plurality of abrasive particles when distributed on the backing extend in similar paths in a down-web direction of the backing, the similar paths are limited to a cross-web range defined by the plurality of walls.

In Example 2, the subject matter of Example 1 optionally includes the first section is disposed up-web of the second section such that the step of distributing the first plurality of abrasive particles initially disposes the first plurality of abrasive particles up-web of the second plurality of abrasive particles on the backing.

In Example 3, the subject matter of any one or more of Examples 1-2 optionally include the first section includes one or more first baffles extending adjacent of the plurality of walls, wherein the first baffles are configured to block entry of the first plurality of abrasive particles into certain of the plurality of slots.

In Example 4, the subject matter of any one or more of Examples 1-3 optionally include the second section includes one or more second baffles extending between adjacent of the plurality of walls, wherein the second baffles are configured to block entry of the second plurality of abrasive particles into certain of the plurality of slots.

In Example 5, the subject matter of Example 4 optionally includes the first baffles are staggered in a cross-web direction from the second baffles so as to extend between different of the plurality of walls such that the first plurality of abrasive particles enter different ones of the plurality of slots than the second plurality of abrasive particles.

In Example 6, the subject matter of any one or more of Examples 1-5 optionally include distributing the first plurality of abrasive particles disposes the first plurality of abrasive particles on a first defined region of the backing and distributing the second plurality of abrasive particles disposes the second plurality of abrasive particles on a second defined region of the backing, and wherein the first defined region is spaced from the second defined region at least a minimum distance in a cross-web direction.

In Example 7, the subject matter of any one or more of Examples 1-6 optionally include distributing the first plurality of abrasive particles disposes the first plurality of abrasive particles on a first defined region of the backing and distributing the second plurality of abrasive particles disposes the second plurality of abrasive particles on the first defined region of the backing, and wherein the first defined region is spaced from other defined regions by at least a minimum distance in a cross-web direction.

In Example 8, the subject matter of any one or more of Examples 1-7 optionally include distributing at least one of the first plurality of abrasive particles and the second plurality of abrasive particles orients at least a majority of at least one of the first plurality of abrasive particles and the second plurality of abrasive particles in passing through the plurality of slots.

In Example 9, the subject matter of any one or more of Examples 1-8 optionally include the backing includes a make coat along a major surface of a backing.

In Example 10, the subject matter of any one or more of Examples 1-9 optionally include the first section comprises a first drum and the second section comprises a second drum, wherein each of the plurality of walls comprise ringed walls of the drum, wherein the first drum and the second drum are configured to rotate as the first plurality of abrasive particles and the second plurality of abrasive particles as the first plurality of abrasive particles and the second plurality of abrasive particles are passed through respective central portions of the first drum and the second drum.

In Example 11, the subject matter of any one or more of Examples 1-10 optionally wherein the plurality of walls comprise a plurality of spaced apart members.

Example 12 is a system for making an abrasive article. The system can include a distribution tool, a backing, a first plurality of abrasive particles and a second plurality of abrasive articles. The distribution tool can include a first section and a second section. Each of the first section and second section can have a plurality of walls defining a plurality of slots. Each of the slots can be open to a lower side of the distribution tool. The backing can be configured to be disposed immediately adjacent the lower side of the distribution tool. The first section can be configured to receive the first plurality of abrasive particles and pass the first plurality of abrasive particles through one or more of the plurality of slots to the backing. The second plurality of abrasive particles can differ in at least one of a size, an average weight and a shape from the first plurality of abrasive particles. The second section can be configured to receive the second plurality of abrasive particles and pass the second plurality of abrasive particles through one or more of the plurality of slots to the backing.

In Example 13, the subject matter of Example 12 optionally includes the distribution tool is arranged relative to the backing such that for each of the slots has: a depth that is substantially perpendicular to a down-web direction of the backing, a length that is substantially parallel to the down-web direction of the backing, and a width that is substantially orthogonal to the depth and the length.

In Example 14, the subject matter of any one or more of Examples 12-13 optionally wherein the section has one or more first baffles extending between adjacent of the plurality of walls, wherein the first baffles are configured to block entry of the first plurality of abrasive particles into certain of the plurality of slots.

In Example 15, the subject matter of any one or more of Examples 12-14 optionally include the second section includes one or more second baffles extending between adjacent of the plurality of walls, wherein the second baffles are configured to block entry of the second plurality of abrasive particles into certain of the plurality of slots.

In Example 16, the subject matter of Example 15 optionally includes the first baffles are staggered in a cross-web direction from the second baffles so as to extend between different of the plurality of walls such that the first plurality of abrasive particles enter different ones of the plurality of slots than the second plurality of abrasive particles.

In Example 17, the subject matter of any one or more of Examples 12-16 optionally include the plurality of slots and the plurality of walls are configured to orient a majority of at least one of the first plurality of abrasive particles and the second plurality of abrasive particles in passing through the plurality of slots.

In Example 18, the subject matter of any one or more of Examples 12-17 optionally include the first section comprises a first drum and the second section comprises a second drum, wherein each of the plurality of walls comprise ringed walls, wherein the first drum and the second drum are configured to rotate as the first plurality of abrasive particles and the second plurality of abrasive particles as the first plurality of abrasive particles and the second plurality of abrasive particles are passed through respective central portions of the first drum and the second drum.

In Example 19, the subject matter of Example 18 optionally includes the plurality of slots in the second drum are staggered in a cross-web direction with respect to the plurality of slots in the first drum such that the ringed walls of the first drum interface with and are disposed in a down-web direction of the plurality of slots in the second drum.

In Example 20, the subject matter of any one or more of Examples 12-19 optionally include the plurality of walls comprise a plurality of spaced apart members.

What is claimed is:

1. A method for making an abrasive article comprising:
    loading a first plurality of abrasive particles and a second plurality of abrasive particles to a distribution tool, the distribution tool has a first section for receiving the first plurality of abrasive particles and a second section for receiving the second plurality of abrasive particles, the first section and the second section each including a plurality of walls defining a plurality of slots, each of the plurality of slots being open to a lower side of the distribution tool, wherein the first plurality of abrasive particles differ in at least one of a size, an average weight, chemistry and a shape from the second plurality of abrasive particles;

distributing the first plurality of abrasive particles from the first section of the distribution tool on to a first major face of a resin-coated backing located immediately below the lower side of the distribution tool and moving relative to the distribution tool; and distributing the second plurality of abrasive particles from the second section of the distribution tool on to the first major face of the backing located immediately below the lower side of the distribution tool and moving relative to the distribution tool;

wherein the first plurality of abrasive particles and the second plurality of abrasive particles when distributed on the backing extend in similar paths in a down-web direction of the backing, the similar paths are limited to a cross-web range defined by the plurality of walls.

2. The method of claim 1, wherein the first section is disposed up-web of the second section such that the step of distributing the first plurality of abrasive particles initially disposes the first plurality of abrasive particles up-web of the second plurality of abrasive particles on the backing.

3. The method of claim 1, wherein the first section includes one or more first baffles extending adjacent of the plurality of walls, wherein the first baffles are configured to block entry of the first plurality of abrasive particles into certain of the plurality of slots.

4. The method of claim 3, wherein the second section includes one or more second baffles extending between adjacent of the plurality of walls, wherein the second baffles are configured to block entry of the second plurality of abrasive particles into certain of the plurality of slots.

5. The method of claim 4, wherein the first baffles are staggered in a cross-web direction from the second baffles so as to extend between different of the plurality of walls such that the first plurality of abrasive particles enter different ones of the plurality of slots than the second plurality of abrasive particles.

6. The method of claim 1, wherein distributing the first plurality of abrasive particles disposes the first plurality of abrasive particles on a first defined region of the backing and distributing the second plurality of abrasive particles disposes the second plurality of abrasive particles on a second defined region of the backing, and wherein the first defined region is spaced from the second defined region at least a minimum distance in a cross-web direction.

7. The method of claim 1, wherein distributing the first plurality of abrasive particles disposes the first plurality of abrasive particles on a first defined region of the backing and distributing the second plurality of abrasive particles disposes the second plurality of abrasive particles on the first defined region of the backing, and wherein the first defined region is spaced from other defined regions by at least a minimum distance in a cross-web direction.

8. The method of claim 1, wherein distributing at least one of the first plurality of abrasive particles and the second plurality of abrasive particles orients at least a majority of at least one of the first plurality of abrasive particles and the second plurality of abrasive particles in passing through the plurality of slots.

9. The method of claim 1, wherein the backing includes a make coat along a major surface of a backing.

10. The method of claim 1, wherein the first section comprises a first drum and the second section comprises a second drum, wherein each of the plurality of walls comprise ringed walls of the drum, wherein the first drum and the second drum are configured to rotate as the first plurality of abrasive particles and the second plurality of abrasive particles are passed through respective central portions of the first drum and the second drum.

11. The method of claim 1, wherein the plurality of walls comprise a plurality of spaced apart members.

* * * * *